(12) United States Patent
Raghavan et al.

(10) Patent No.: US 12,368,482 B2
(45) Date of Patent: Jul. 22, 2025

(54) ENHANCED BEAMFORMING CODEBOOK DESIGN WITH OUT-OF-COVERAGE BEAMS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/469,245

(22) Filed: Sep. 18, 2023

(65) Prior Publication Data

US 2025/0096863 A1    Mar. 20, 2025

(51) Int. Cl.
*H04B 7/06* (2006.01)
*H04B 7/0456* (2017.01)
*H04W 72/23* (2023.01)

(52) U.S. Cl.
CPC ......... *H04B 7/0617* (2013.01); *H04B 7/0482* (2013.01); *H04W 72/23* (2023.01)

(58) Field of Classification Search
CPC ....... H04L 67/10; H04L 67/12; H04L 5/0048; H04L 5/0051; H04L 5/0023; H04L 5/0026; H04L 1/0026; H04L 25/021; H04L 25/0228; H04W 16/28; H04W 4/40; H04W 24/02; H04W 4/70; H04W 4/027; H04W 16/02; H04W 4/44; H04W 4/38; H04W 72/046; H04B 7/0617; H04B 7/086; H04B 17/309; H04B 7/0408; H04B 7/024; H04B 17/318; H04B 7/0456; H04B 7/0452
See application file for complete search history.

(56) References Cited

U.S. PATENT DOCUMENTS

| | | | |
|---|---|---|---|
| 2017/0347391 A1* | 11/2017 | Tenny | H04B 7/0617 |
| 2019/0222277 A1 | 7/2019 | Park et al. | |
| 2019/0223247 A1* | 7/2019 | Kang | H04B 7/0408 |
| 2022/0141813 A1 | 5/2022 | Saxena et al. | |
| 2024/0250723 A1* | 7/2024 | Mo | H04B 7/0626 |
| 2024/0259832 A1* | 8/2024 | Raghavan | H04W 8/22 |

FOREIGN PATENT DOCUMENTS

EP    4149131 A1    3/2023

OTHER PUBLICATIONS

Partial International Search Report—PCT/US2024/044259—ISA/EPO—Nov. 20, 2024.
International Search Report and Written Opinion—PCT/US2024/044259—ISA/EPO—Feb. 24, 2025.

* cited by examiner

*Primary Examiner* — Eva Y Puente
(74) *Attorney, Agent, or Firm* — Loza & Loza, LLP

(57) ABSTRACT

Aspects relate to mechanisms for generating an enhanced beamforming codebook to cover an out-of-coverage region of an antenna module of a wireless communication device (e.g., a UE). The UE may include an initial beamforming codebook configuring a plurality of beam weights intended to cover an in-coverage region corresponding to a boresight direction and a neighborhood thereof of the antenna module. The UE may further configure one or more additional sets of beam weights intended to cover the out-of-coverage region beyond the boresight direction and the neighborhood thereof and then add the one or more additional sets of beam weights to the initial beamforming codebook to produce the enhanced beamforming codebook.

30 Claims, 16 Drawing Sheets

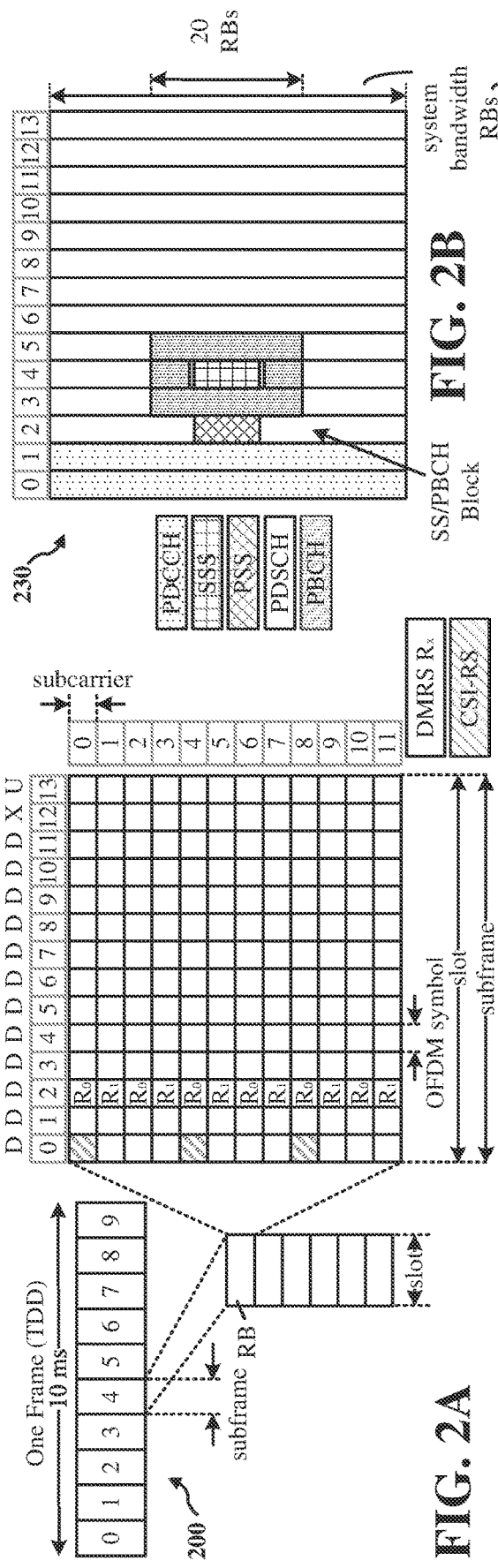
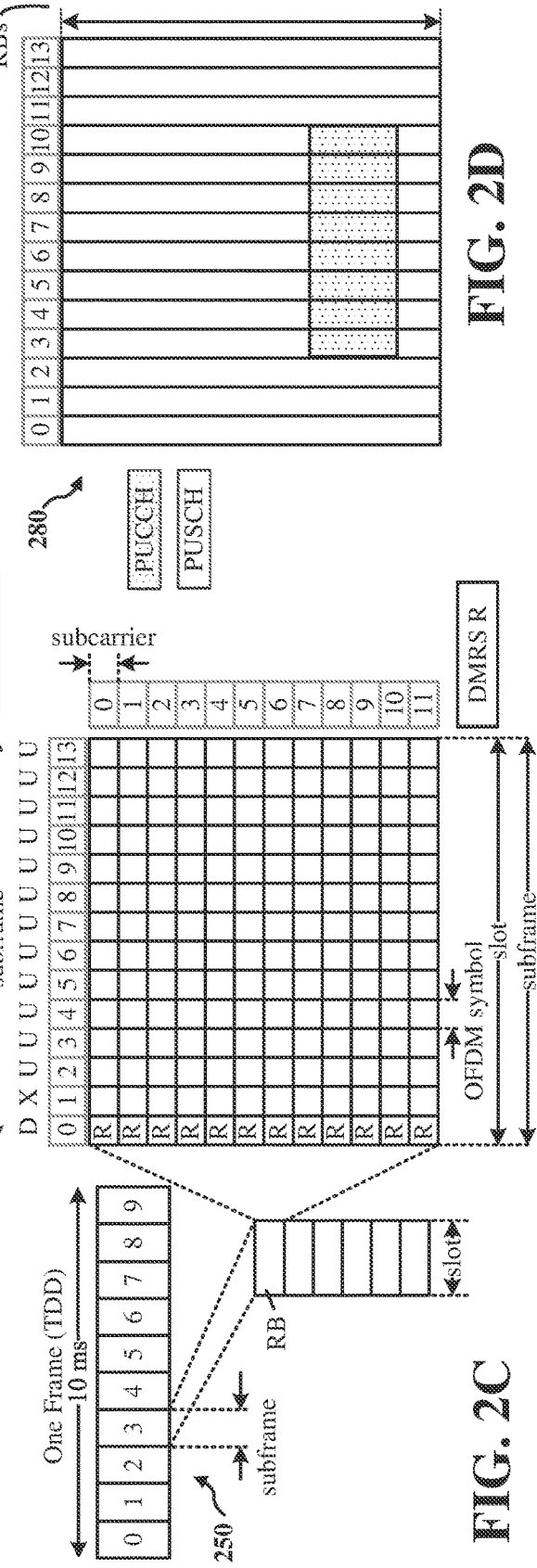

| Beamforming Codebook | |
|---|---|
| Beam 1 | Beam Weights (1) |
| Beam 2 | Beam Weights (2) |
| Beam 3 | Beam Weights (3) |
| Beam 4 | Beam Weights (4) |
| Beam 5 | Beam Weights (5) |

FIG. 7

ENHANCED BEAMFORMING CODEBOOK DESIGN WITH OUT-OF-COVERAGE BEAMS

TECHNICAL FIELD

The technology discussed below relates generally to wireless communication systems, and more particularly, to hybrid beamforming codebook enhancements in wireless communication systems.

INTRODUCTION

Wireless communication systems, such as those specified under fifth generation (5G) systems, referred to as New Radio (NR) systems, sixth generation (6G) systems, and other future generations, a network entity and user equipment (UE) may utilize beamforming to compensate for high path loss and short range. Beamforming is a signal processing technique used with an antenna array module for directional signal transmission and/or reception. Each antenna in the antenna array module transmits a signal that is combined with other signals of other antennas of the same array in such a way that signals at particular angles experience constructive interference while others experience destructive interference.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus for wireless communication at a wireless communication device includes one or more antenna modules, one or more memories and one or more processors coupled to the one or more memories and the one or more antenna modules. The one or more memories can be configured to store an initial beamforming codebook configuring a plurality of beam weights intended to cover an in-coverage region corresponding to the boresight direction and a neighborhood thereof of an antenna module of the wireless communication device. The one or more processors can be configured to configure one or more additional sets of beam weights intended to cover an out-of-coverage region beyond the boresight direction and the neighborhood thereof of the antenna module, and add the one or more additional sets of beam weights to the initial beamforming codebook to produce an enhanced beamforming codebook.

Another example provides a method operable at a wireless communication device. The method includes providing an initial beamforming codebook configuring a plurality of beam weights intended to cover an in-coverage region corresponding to a boresight direction and a neighborhood thereof of an antenna module of the wireless communication device. The method further includes configuring one or more additional sets of beam weights intended to cover an out-of-coverage region beyond the boresight direction and the neighborhood thereof of the antenna module, and adding the one or more additional sets of beam weights to the initial beamforming codebook to produce an enhanced beamforming codebook.

Another example provides apparatus for wireless communication at a network entity. The apparatus includes one or more memories and one or more processors coupled to the one or more memories. The one or more processors are configured to receive a capability of a user equipment (UE) to use an enhanced beamforming codebook to cover an out-of-coverage region beyond a boresight direction and a neighborhood thereof of an antenna module of the UE, and provide an indication of a number of one or more sets of beam weights to add to an initial beamforming codebook of the UE to produce the enhanced beamforming codebook based on the capability.

Another example provides a method operable at a wireless communication device. The method includes receiving a capability of a user equipment (UE) to use an enhanced beamforming codebook to cover an out-of-coverage region beyond a boresight direction and a neighborhood thereof of an antenna module of the UE, and providing an indication of a number of one or more sets of beam weights to add to an initial beamforming codebook of the UE to produce the enhanced beamforming codebook based on the capability.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 2A, 2B, 2C, and 2D are diagrams illustrating examples of a first 5G/NR frame. DL channels within a 5G/NR subframe, a second 5G/NR frame, and UL channels within a 5G/NR subframe, respectively.

FIG. 7 is a diagram illustrating an example of a beamforming codebook according to some aspects.

DETAILED DESCRIPTION

Figure 1:
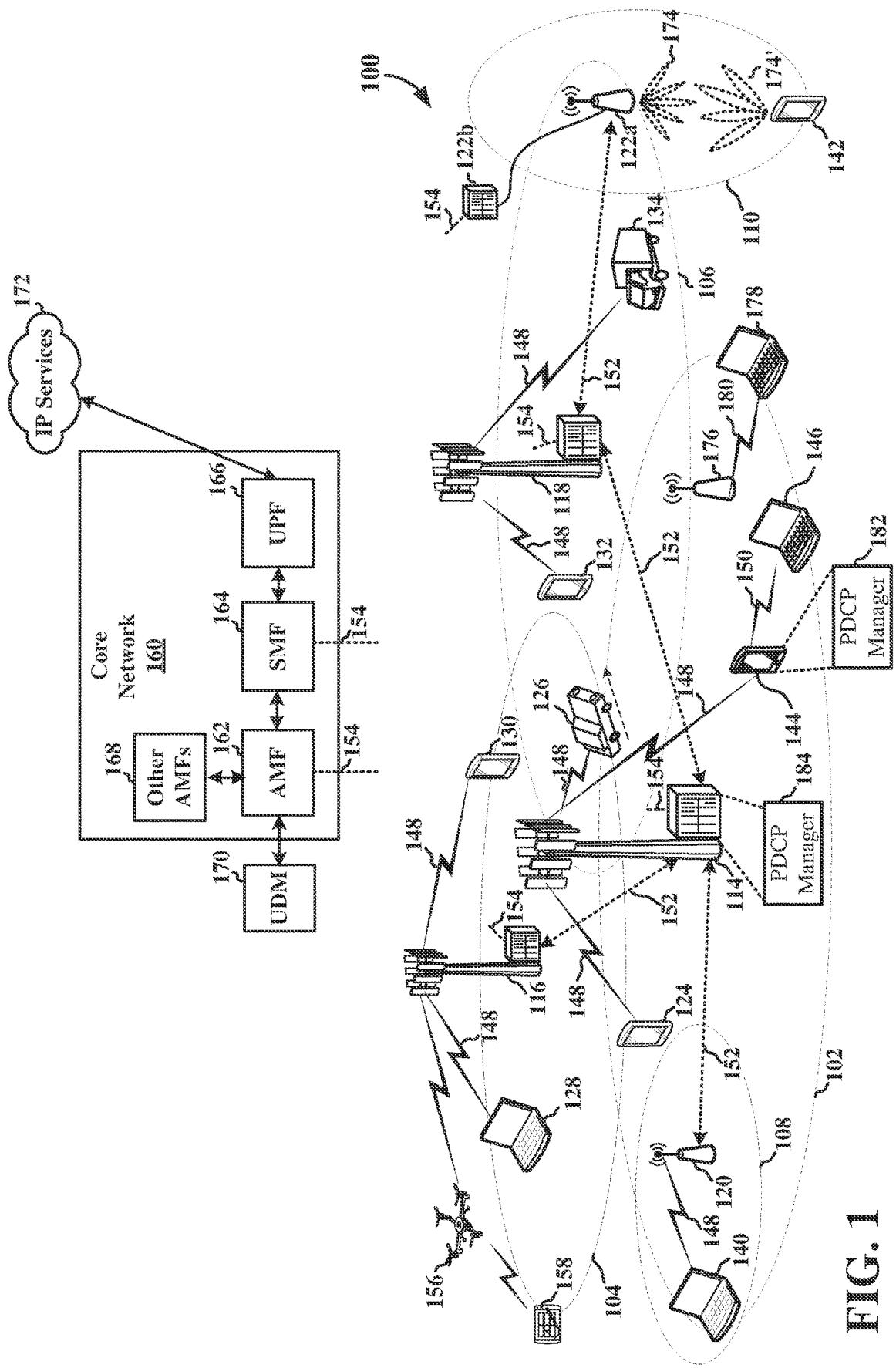
FIG. 1 is a diagram illustrating an example of a wireless communication system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., network entity and/or UE), end-user devices, etc., of varying sizes, shapes, and constitution.

In millimeter wave systems, multiple antennas of an antenna module, and multiple antenna modules (e.g., antenna arrays), are used at the network entity and the user equipment (UE) to facilitate beamforming. To realize the link budget gains expected from beamforming, an analog/hybrid beamforming codebook may be constructed and stored at the UE. Each entry in the beamforming codebook may include a set of beam weights (e.g., phase shift and amplitude control combinations to be used over the antenna array) that enable energy to be steered around fixed directions within the neighborhood of the boresight direction of an antenna module of the UE. Thus, the sets of beam weights maintained in the beamforming codebook cover what may be referred to herein as an in-coverage region of the antenna module (e.g., the boresight direction and its neighborhood). Performance with these beam weights may be used to achieve near-optimal performance in the in-coverage region. However, the performance gap in the out-of-coverage region beyond the boresight direction and its neighborhood may be significant.

Various aspects are related to mechanisms for generating an enhanced beamforming codebook to cover an out-of-coverage region of an antenna module of a wireless communication device (e.g., a UE). The wireless communication device may include an initial beamforming codebook configuring a plurality of beam weights intended to cover an in-coverage region corresponding to the boresight direction and a neighborhood thereof of the antenna module. The wireless communication device may further configure one or more additional sets of beam weights intended to cover an out-of-coverage region beyond the boresight direction and the neighborhood thereof of the antenna module and to add the additional sets of beam weights to the initial beamforming codebook to produce the enhanced beamforming codebook. For example, each additional set of beam weights may correspond to a side lobe direction or its neighborhood and/or a back lobe direction or its neighborhood of the antenna module.

In some examples, the plurality of beam weights include initial sets of beam weights, each corresponding to a combination of amplitude and phase shift values for each antenna element in the antenna module. The initial beamforming codebook may include a respective entry for each of the initial sets of beam weights, thus defining a plurality of beams of the UE. The enhanced codebook may further include a respective entry for each of the additional sets of beam weights, thus defining additional beams (e.g., out-of-coverage beams) of the UE.

In some examples, the UE may be configured to measure a response of the antenna module (e.g., electric (E) fields) over the out-of-coverage region to identify the one or more additional sets of beam weights that maximize a projection of the energy in the out-of-coverage region. In other examples, the UE may select the one or more additional sets of beam weights from a set of pre-configured beam weights in the out-of-coverage region. For example, the pre-configured beam weights may correspond to theoretical discrete Fourier transform (DFT) beam weights or progressive phase shift beam weights in specified directions or beamspace in the out-of-coverage region.

In some examples, the network entity may configure the number of additional sets of beam weights (e.g., the number of additional beams) to be added to the enhanced beamforming codebook. For example, the network entity may configure the number of additional sets of beam weights based on a capability of the UE to use the enhanced beamforming codebook and/or a reliability of out-of-coverage measurements performed by the UE. The reliability may be expressed, for example, as a mean squared error of the out-of-coverage measurements or a standard deviation of the out-of-coverage measurements.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and 122a/122b may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122a/122b may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the 3$^{rd}$ Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity 122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122a/122b via one or more beams 174' in one or more receive directions. The UE 142 may also transmit a beamformed signal to the network entity 122a/122b via the one or more beams 174' in one or more transmit directions. The network entity 122a/122b may further receive the beamformed signal from the UE 142 via the one or more beams 174 in one or more receive directions. The network entity 122a/122b and the UE 142 may perform beam training to determine the best transmit and receive beams 174/174' for communication between the network entity 122a/122b and the UE 142. The transmit and receive beams for the network entity 122a/122b may or may not be the same. The transmit and receive directions for the UE 142 may or may not be the same.

The communication links 148 may utilize one or more carriers. The network entities and UEs may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5

(114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122a/122b provide wireless access points to the core network 160 for any number of UEs or other mobile apparatuses via core network backhaul links 154. The core network backhaul links 154 may provide a connection between the network entities 114, 116, 118, 120, and 122a/122b and the core network 170. In some examples, the core network backhaul links 154 may include backhaul links 152 that provide interconnection between the respective network entities.

The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 24 slots/subframe. The subcarrier spacing and symbol length/duration are a function of the numerology. The subcarrier spacing may be equal to 24*15 kKz, where u is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
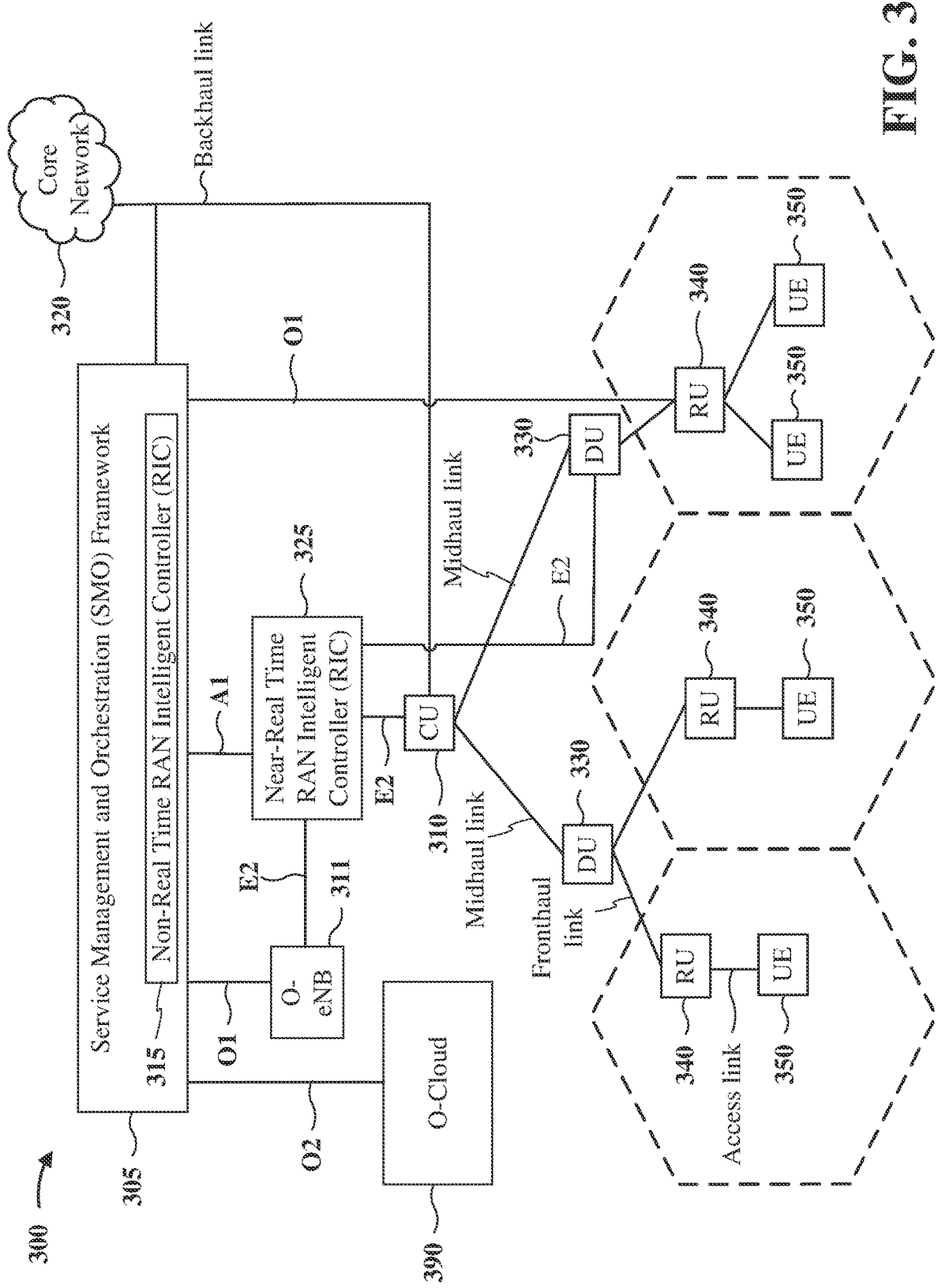
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E3 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O3 interface). Such virtualized network elements can include, but are not limited to, CUs 310, DUs 330, RUs 340 and Near-RT RICs 325. In some implementations, the SMO Framework 305 can communicate with a hardware aspect of a 5G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E3 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Beamforming is a signal processing technique that may be used at the transmitter and/or receiver to shape or steer an antenna beam (e.g., a transmit beam or receive beam) along a spatial path between the transmitter and the receiver. A network entity (e.g., gNB) may generally be capable of communicating with UEs using transmit beams (e.g., downlink transmit beams) of varying beam widths. The UE may further be configured to utilize one or more downlink receive beams to receive signals from the network entity. In some examples, to select one or more downlink transmit beams and one or more downlink receive beams for communication with a UE, the network entity may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a Layer 1 (L1) measurement report to the network entity indicating the RSRP of one or more of the measured downlink transmit beams. The network entity may then select one or more serving downlink beams (e.g., downlink transmit beams and downlink receive beams) for communication with the UE based on the L1 measurement report. The resulting selected downlink transmit beam and downlink receive beam may form a downlink beam pair link. In other examples, when the channel is reciprocal, the network may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the network entity) may be selected by measuring the RSRP of received uplink reference signals (e.g., SRSs) or downlink reference signals (e.g., SSBs or CSI-RSs) during an uplink or downlink beam sweep. For example, the network entity may determine the uplink beams either by uplink beam management via an SRS beam sweep with measurement at the network entity or by downlink beam management via an SSB/CSI-RS beam sweep with measurement at the UE. The selected uplink beam may be indicated by a selected SRS resource identifier (SRI) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 4:
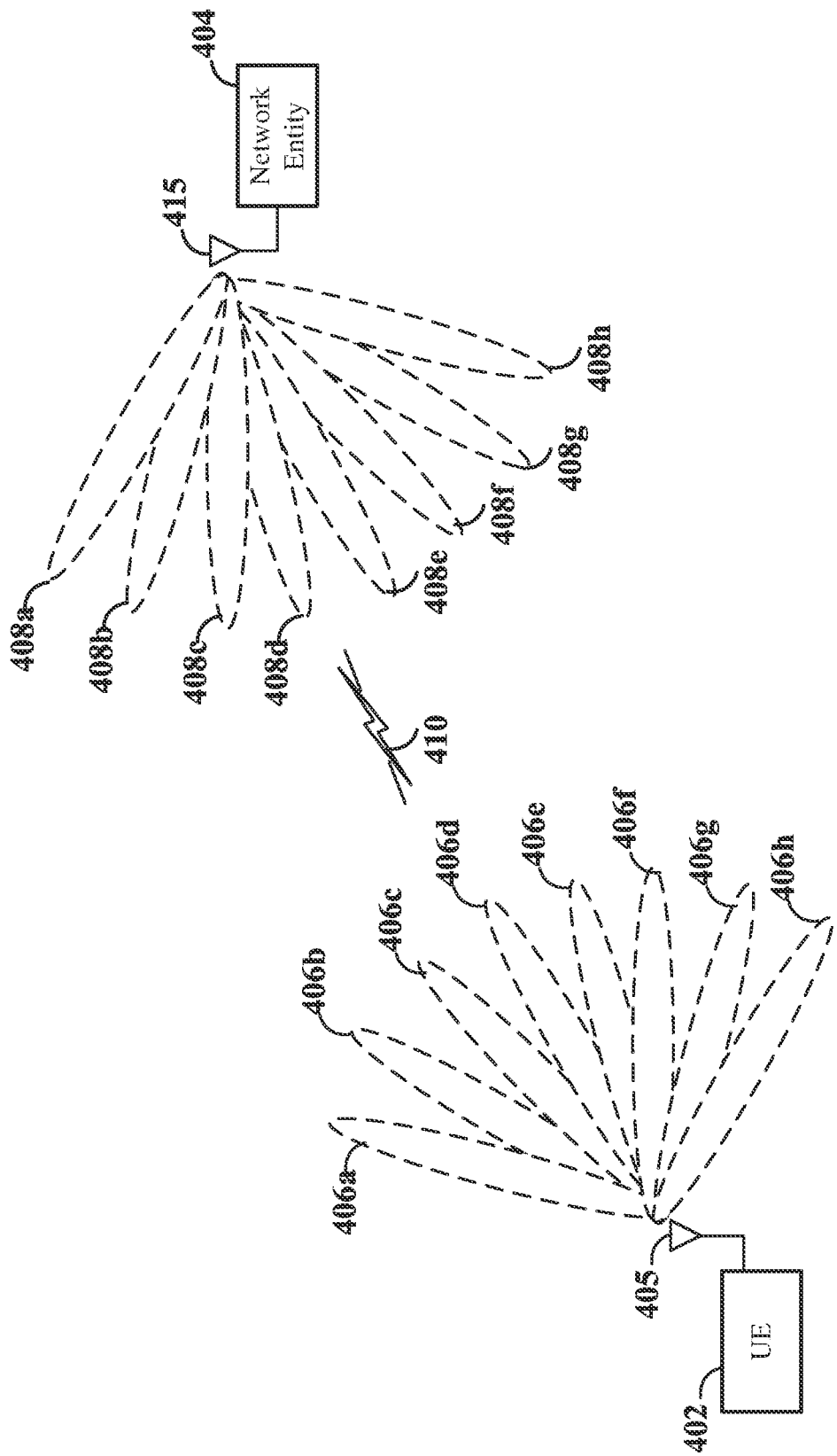
FIG. 4 illustrates an example of a wireless communication system supporting beamforming between a network entity and a UE device according to some aspects.

FIG. 4 is a diagram illustrating communication between a network entity 404 and a UE 402 using beamformed signals according to some aspects. The network entity 404 may be any of the network entities (e.g., gNBs) or NTN entities illustrated in FIGS. 1 and/or 2, and the UE 402 may be any of the UEs illustrated in FIGS. 1 and/or 2.

In the example shown in FIG. 4, the network entity 404 is configured to generate a plurality of beams 408a-408h, each associated with a different beam direction. In addition, the UE 402 is configured to generate a plurality of beams 406a-406h, each associated with a different beam direction. The network entity 404 and UE 402 may select one or more beams 408a-408h on the network entity 404 and one or more beams 406a-406h on the UE 402 for communication of uplink and downlink signals therebetween using a downlink beam management scheme and/or an uplink beam management scheme.

Beamforming may be achieved by combining the signals communicated via, for example, antennas 405 or 415 (e.g., antenna elements of an antenna array) such that some of the signals experience constructive interference while others experience destructive interference. To create the desired constructive/destructive interference, the UE 402 or network entity 404 may apply amplitude and/or phase offsets to signals transmitted or received from the antenna elements 405 or 415 associated with the UE 402 or network entity 404. In some examples, the antenna elements may be mapped to antenna ports for generation of beams. Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

In an example of a downlink beam management scheme for selection of downlink beams, the network entity 404 may be configured to sweep or transmit on each of a plurality of downlink transmit beams 408a-408h during one or more synchronization slots. For example, the network entity 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 408a-408h transmitted during a same symbol may not be adjacent to one another. In some examples, the network entity 404 may transmit more or less beams distributed in all directions (e.g., 360 degrees).

In addition, the UE 402 is configured to receive the downlink beam reference signals on a plurality of downlink receive beams 406a-406h. In some examples, the UE 402 searches for and identifies each of the downlink transmit beams 408a-408h based on the beam reference signals. The UE 402 then performs beam measurements (e.g., RSRP, SINR, reference signal received quality (RSRQ), etc.) on the beam reference signals on each of the downlink receive beams 406a-406h to determine the respective beam quality of each of the downlink transmit beams 408a-408h as measured on each of the downlink receive beams 406a-406h.

The UE 402 can generate and transmit an L1 measurement report, including the respective beam index (beam identifier (ID)) and beam measurement of one or more of the downlink transmit beam 408a-408h on one or more of the downlink receive beams 406a-406h to the network entity 404. The network entity 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the network entity from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The network entity 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 408*d*) on the network entity 404 and a single downlink receive beam (e.g., beam 406*d*) on the UE may form a single downlink BPL used for communication between the network entity 404 and the UE 402. In another example, multiple downlink transmit beams (e.g., beams 408*c*, 408*d*, and 408*e*) on the network entity 404 and a single downlink receive beam (e.g., beam 406*d*) on the UE 402 may form respective downlink BPLs used for communication between the network entity 404 and the UE 402. In another example, multiple downlink transmit beams (e.g., beams 408*c*, 408*d*, and 408*e*) on the network entity 404 and multiple downlink receive beams (e.g., beams 406*d* and 406*c*) on the UE 402 may form multiple downlink BPLs used for communication between the network entity 404 and the UE 402. In this example, a first downlink BPL may include downlink transmit beam 408*c* and downlink receive beam 406*d*, a second downlink BPL may include downlink transmit beam 408*d* and downlink receive beam 406*d*, and a third downlink BPL may include downlink transmit beam 408*e* and downlink receive beam 406*c*.

When the channel is reciprocal, the above-described downlink beam management scheme may also be used to select one or more uplink BPLs for uplink communication from the UE 402 to the network entity 404. For example, the downlink BPL formed of beams 406*d* and 408*d* may also serve as an uplink BPL. Here, beam 406*d* is utilized as an uplink transmit beam, while beam 408*d* is utilized as an uplink receive beam.

In an example of an uplink beam management scheme, the UE 402 may be configured to sweep or transmit on each of a plurality of uplink transmit beams 406*a*-406*h*. For example, the UE 402 may transmit an SRS on each beam in the different beam directions. In addition, the network entity 404 may be configured to receive the uplink beam reference signals on a p06lurality of uplink receive beams 408*a*-408*h*. In some examples, the network entity 404 searches for and identifies each of the uplink transmit beams 406*a*-406*h* based on the beam reference signals. The network entity 404 then performs beam measurements (e.g., RSRP, SINR, RSRQ, etc.) on the beam reference signals on each of the uplink receive beams 408*a*-408*h* to determine the respective beam quality of each of the uplink transmit beams 406*a*-406*h* as measured on each of the uplink receive beams 408*a*-408*h*.

The network entity 404 may then select one or more uplink transmit beams on which the UE 402 will transmit unicast downlink control information and/or user data traffic to the network entity 404. In some examples, the selected uplink transmit beam(s) have the highest gain. The network entity 404 may further select a corresponding uplink receive beam on the network entity 404 for each selected serving uplink transmit beam to form a respective uplink beam pair link (BPL) for each selected serving uplink transmit beam. For example, the network entity 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The network entity 404 may then notify the UE 402 of the selected uplink transmit beams. For example, the network entity 404 may provide the SRS resource identifiers (SRIs) identifying the SRSs transmitted on the selected uplink transmit beams. In some examples, the network entity 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the network entity 404 to the UE 402. For example, the uplink BPLs may also be utilized as downlink BPLs.

Figure 5:
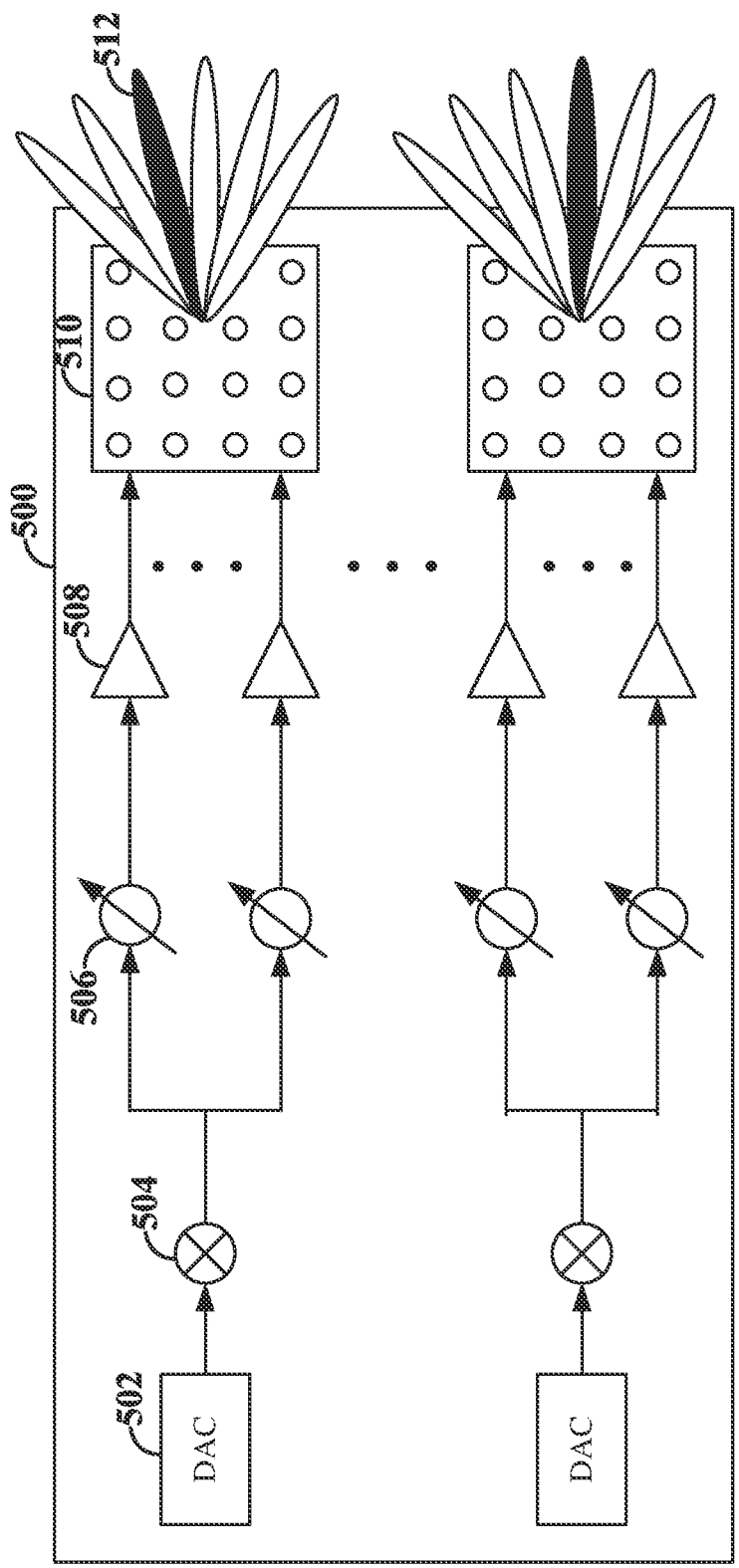
FIG. 5 is a diagram illustrating an example of a transmitter architecture for beamforming according to some aspects.

FIG. 5 is a diagram illustrating an example of a transmitter architecture 500 for beamforming according to some aspects. The transmitter architecture 500 may include, for example, one or more digital-to-analog converters (DACs) 502, each configured to receive a respective digital baseband signal and to convert the respective digital baseband signal to an analog baseband signal. Each of the analog baseband signals may be upconverted to an RF signal by respective mixers 504. Each RF signal may then be mapped onto antenna elements of an antenna array 510 via analog phase-shifters 506 and amplified by a respective power amplifier (PA) 508 to produce respective beamformed signals 512 for transmission over-the-air (OTA) to a receiving device. In other examples, digital phase-shifters may be utilized for digital beamforming to produce the beamformed signals 512.

Figure 6:
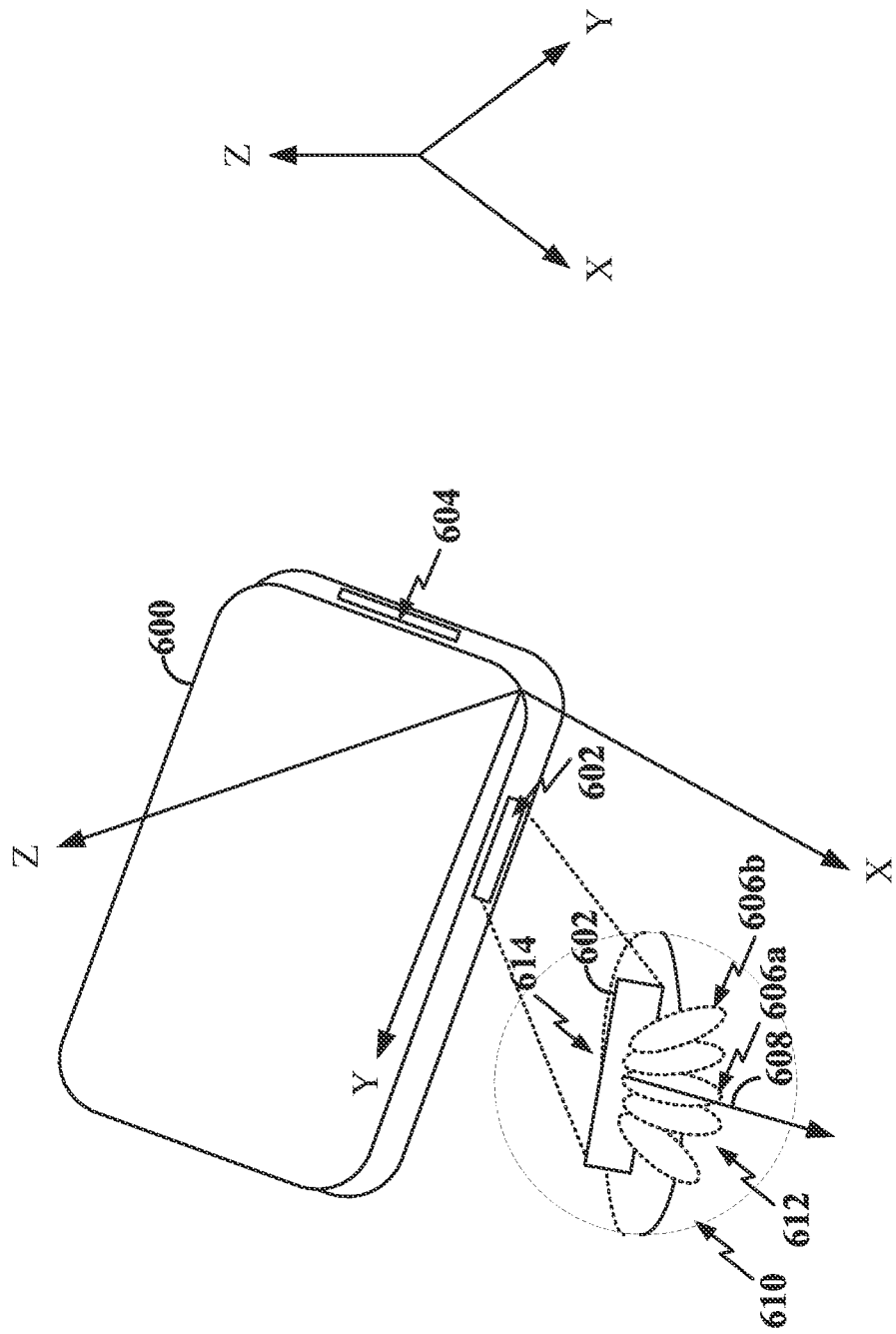
FIG. 6 is a diagram illustrating an example of antenna modules of a wireless communication device according to some aspects.

FIG. 6 is a diagram illustrating an example of a wireless communication device 600 including a plurality of antenna modules 602 and 604 (e.g., antenna arrays) according to some aspects. The wireless communication device 600 may correspond to any of the UEs or other suitable devices illustrated in FIGS. 1, 3 and/or 4. In addition, the wireless communication device 600 may be a 5G wireless communication device configured to transmit and receive mmWave frequencies using antenna modules 602 and 604. Although two antenna modules 602 and 604 are illustrated in FIG. 6, it should be understood that the wireless communication device 600 may include any number of antenna modules.

Each antenna module (e.g., antenna module 602) may be capable of emitting energy in the form of a plurality of beams 606*a* and 606*b* to cover a part of the sphere 610 surrounding the respective antenna module 604. Each of the beams 606*a* and 606*b* may be directed towards a different portion of a coverage area (e.g., of the sphere 610) of the respective antenna module 602. In the example shown in FIG. 6, the antenna module 602 is configured to generate beams 606*a* and 606*b* within an in-coverage region 612 of the antenna array. The in-coverage region 612 includes a boresight direction 608 of the antenna module 602 and a neighborhood of the boresight direction 608 of the antenna module 602. A simple illustration of a neighborhood includes the regions that are within +/−M degrees in both elevation ($\theta$) and azimuth ($\varphi$) from the boresight direction 608, where M is less than 180 degrees and is configured or chosen appropriately. Typically, at millimeter wave carrier frequencies, M is chosen to be 30 to 45 degrees since the antenna elements are directional by design. In the example shown in FIG. 6, the antenna module 602 has a boresight direction 608 along the X-axis (with an elevation angle ($\theta$)=90° and azimuth angle ($\varphi$)=0°). Similarly, the antenna module 604 has a boresight direction along the Y-axis ($\theta$=90° and $\varphi$=0°).

The sphere 610 surrounding each antenna module (e.g., antenna module 602) further includes an out-of-coverage region 614, which typically corresponds to the side lobe direction(s) and back lobe direction(s)/regions of the antenna module 602. The out-of-coverage region 614 is typically ignored in the beam design since this region has poorer gains than that can be obtained in the in-coverage region 612.

The number of beams 606a and 606b generated per antenna module 602 and 604 may depend, for example, on the number of antenna subarrays and the number of antenna elements in each subarray of each antenna module 602 and 604. In general, to meet link budget requirements for downlink transmissions (e.g., from the gNB to the wireless communication device 600), each antenna module 602 and 604 may support N beams per N antenna subarrays in the module. Such a design ensures that the cross-over point between adjacently steered beams is approximately 4 dB below the peak of the main lobe. For example, assuming that there is one antenna subarray per antenna module 602 and 604, the wireless communication device 600 shown in FIG. 6 may support N beams per antenna module and 2N beams in total. If N=5, as shown in the example of FIG. 6, the wireless communication device 600 may support 10 total beams (e.g., five beams from each antenna module 602 and 604). However, it should be understood that each antenna module 602 and 604 may support any suitable numbers of beams and this is a design parameter/metric capturing the performance-latency tradeoffs.

The number of beams 606a and 606b generated by each antenna module 602 and 604 may further depend on a respective analog/hybrid beamforming codebook configured for each of the antenna modules 602 and 604. For example, the antenna modules 602 and 604 may be 5×1 dual-polarization arrays and the beamforming codebooks for each of the antenna modules 602 and 604 may be size-5 or size-11 codebooks, supporting five beams or eleven beams, respectively. The beamforming codebooks may be maintained (e.g., stored) in the wireless communication device 600, for example, in a radio frequency integrated circuit (RFIC) memory (shown, for example, in FIG. 13) of the wireless communication device.

FIG. 7 is a diagram illustrating an example of a beamforming codebook 700 according to some aspects. In general, a beamforming codebook 700 includes a plurality of entries 702, each including a set of beam weights 704 defining a respective beam. Each set of beam weights 704 corresponds to a combination of amplitude and phase shift values for each antenna element in an antenna module of the wireless communication device. The example shown in FIG. 7 is a size-5 codebook 700 with five entries 702 to configure five beams on an antenna module of a wireless communication device. The five sets of beam weights 704 in the beamforming codebook 700 are designed to steer energy around fixed directions within the neighborhood of the boresight direction of the antenna module. Thus, these beam weights 704 cover the in-coverage region (boresight direction plus neighborhood) of the antenna module. Although the performance of the beam weights 704 in the in-coverage region may be near-optimal, there may be significant performance gaps in the out-of-coverage region using the beamforming codebook 700 shown in FIG. 7.

Figure 8:
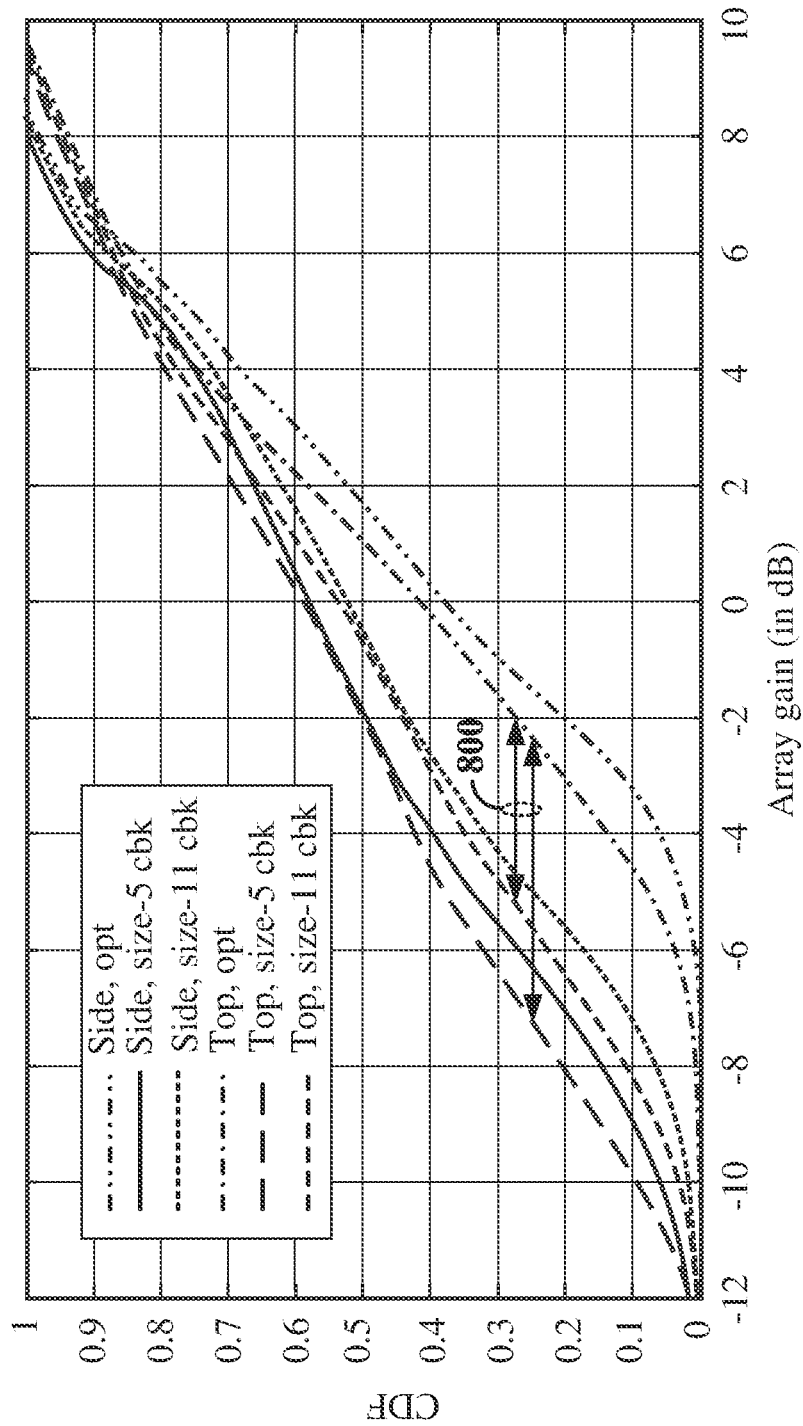
FIG. 8 is a diagram illustrating an example of spherical coverage performance with the antenna modules of a wireless communication device according to some aspects.

FIG. 8 is a diagram illustrating an example of the spherical coverage performance with the codebook designed for the antenna modules of a wireless communication device according to some aspects. In FIG. 8, a size-5 codebook and a size-11 codebook steering energy around the boresight direction (and neighborhood) of each 5×1 dual-polarization antenna array (e.g., on the top and side of a wireless communication device, as shown in FIG. 6) are considered. For benchmarking purposes, optimal beam weights corresponding to maximal ratio combining (MRC) beam weights for every combination of elevation ($\theta$) and azimuth ($\varphi$) are also considered. The performance with optimal beam weights assumes infinite precision phase and amplitude control, which may not be achievable in practice. However, as FIG. 8 shows, the gap between the optimal performance and the codebook performance of either the size-5 or size-11 codebook (for each of the antenna modules) is minimal in the top 30 percentile points over the sphere (e.g., corresponding to the in-coverage region of the antenna module, where the designed beams capture the E fields accurately leading to good performance). In the remaining 70 percentile points, a gap 800 may be significant. For example, as shown in FIG. 8, there may be approximately a 3.5 dB delta between the optimal performance and the average codebook performance across the size-5 and size-11 codebooks at the 20th percentile.

Most UE implementations without a large number of antenna modules (for example, with just the top and side antenna modules shown in FIG. 6) fail tight spherical coverage tests imposed by network operators at lower percentile points. For example, some network operator's spherical coverage tests are performed at the 20th percentile, and as shown in FIG. 8, a 3.5 dB delta at that percentile point may result in the UE failing the coverage test, thus preventing the UE from being operated in the network.

Therefore, various aspects are directed towards an enhanced beamforming codebook including one or more additional sets of beam weights (additional entries in the beamforming codebook corresponding to additional beams) to cover an out-of-coverage region beyond the boresight direction and its neighborhood. By adding out-of-coverage beams, the lower percentile (e.g., 20th percentile) points in spherical coverage may be improved, thus increasing the likelihood that a UE may operate in a network. In some examples, the spherical coverage may be improved by 1.3 to 1.5 dB. Thus, the gap between the optimal codebook performance and the enhanced beamforming codebook may decrease. In some examples, performance enhancement may be more for larger sized antenna modules (e.g., 2×4 planar or L shaped arrays, 1×6 arrays, etc.).

Figure 9:
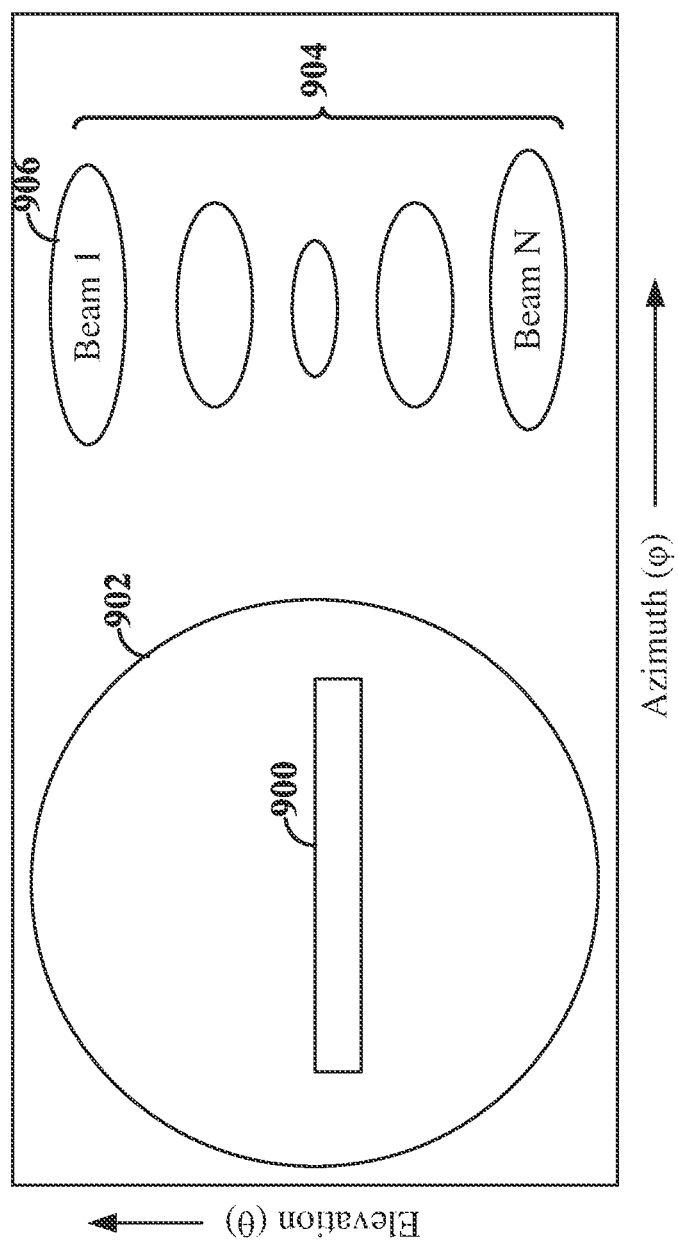
FIG. 9 is a diagram illustrating an example of out-of-coverage beams that may be added to a beamforming codebook according to some aspects.

FIG. 9 is a diagram illustrating an example of out-of-coverage beams that may be added to a beamforming codebook according to some aspects. FIG. 9 is a two-dimensional representation of an antenna module 900 capable of generating beams for every combination of elevation ($\theta$) and azimuth ($\varphi$) to cover a sphere surrounding the antenna module 900. A portion of the beams are within an in-coverage region 902 corresponding to a boresight direction of the antenna module 900 and the neighborhood around the boresight direction. The neighborhood includes beams that are within +/−M degrees in both elevation ($\theta$) and azimuth ($\varphi$) from the boresight direction 608, where M is less than 180 degrees. The remaining portion of the beams are within an out-of-coverage region 904 beyond the boresight direction and its neighborhood, and are shown in FIG. 9 as out-of-coverage beams 906 (Beam 1, . . . , Beam N). For example, the out-of-coverage region 904 may include side lobes directions and/or back lobes directions of the antenna module 900.

One or more of the out-of-coverage beams 906 may be selected to be added to an in-coverage beamforming codebook (initial beamforming codebook) to produce an enhanced beamforming codebook that further covers the out-of-coverage region 904. In particular, a UE may design beam weights to steer energy over certain steering angles in the out-of-coverage-region and add the out-of-coverage beam weights to the initial beamforming codebook to produce the enhanced beamforming codebook. In some examples, referring again to FIG. 8, the UE may design beam weights for the out-of-coverage region in response to a gap 800 between an optimal performance with maximal ratio combining and an actual performing of the initial beamforming codebook exceeds a threshold (e.g., 3 dB). In some examples, the threshold may correspond to the maximum gap at the 20th percentile for a network operator imposed spherical coverage test.

Figure 10:
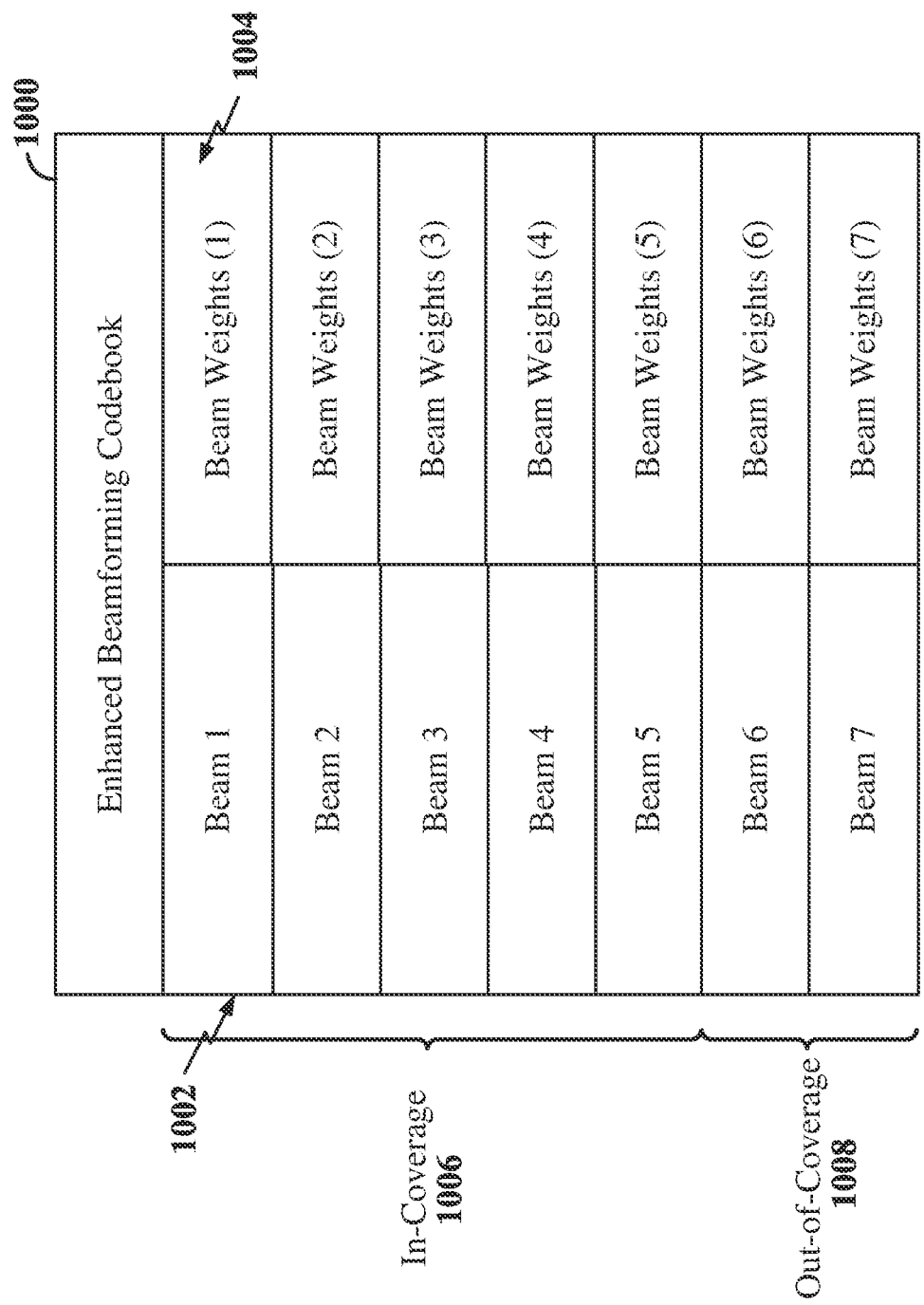
FIG. 10 is a diagram illustrating an example of an enhanced beamforming codebook according to some aspects.

FIG. 10 is a diagram illustrating an example of an enhanced beamforming codebook according to some aspects. The enhanced beamforming codebook 1000 includes a plurality of entries 1002, each including a set of beam weights 1004 defining a respective beam. Each set of beam weights 1004 corresponds to a combination of amplitude and phase shift values for each antenna element in an antenna module of the wireless communication device. The example shown in FIG. 10 is an enhanced size-5 codebook 1000 with five of the entries 1002 to configure five in-coverage region beams 1006 on an antenna module of a wireless communication device. The sets of beam weights 1004 corresponding to the in-coverage region beams 1006 in the beamforming codebook 1000 are designed to steer energy around fixed directions within the neighborhood of the boresight direction of the antenna module. The enhanced size-5 codebook 1000 further includes two additional entries 1002 to configure two out-of-coverage region beams 1008 on the antenna module. The sets of beam weights 1004 corresponding to the out-of-coverage region beams 1008 are designed to steer energy beyond the boresight direction and its neighborhood (e.g., to cover at least one of a side lobe or a back lobe of the antenna module).

In some examples, the sets of beam weights 1004 corresponding to the out-of-coverage region beams 1008 may be designed by measuring a response of the antenna module over the out-of-coverage region (e.g., based on E fields) to identify one or more additional sets of beam weights that maximize projection of energy in the out-of-coverage region. In other examples, the sets of beam weights 1004 corresponding to the out-of-coverage beams 1008 may be designed by selecting one or more additional sets of beam weights from a set of pre-configured beam weights in the out-of-coverage region. For example, the pre-configured beam weights may correspond to theoretical DFT or progressive phase shift beams in specified directions or in the beamspace in the out-of-coverage region.

Figure 11:
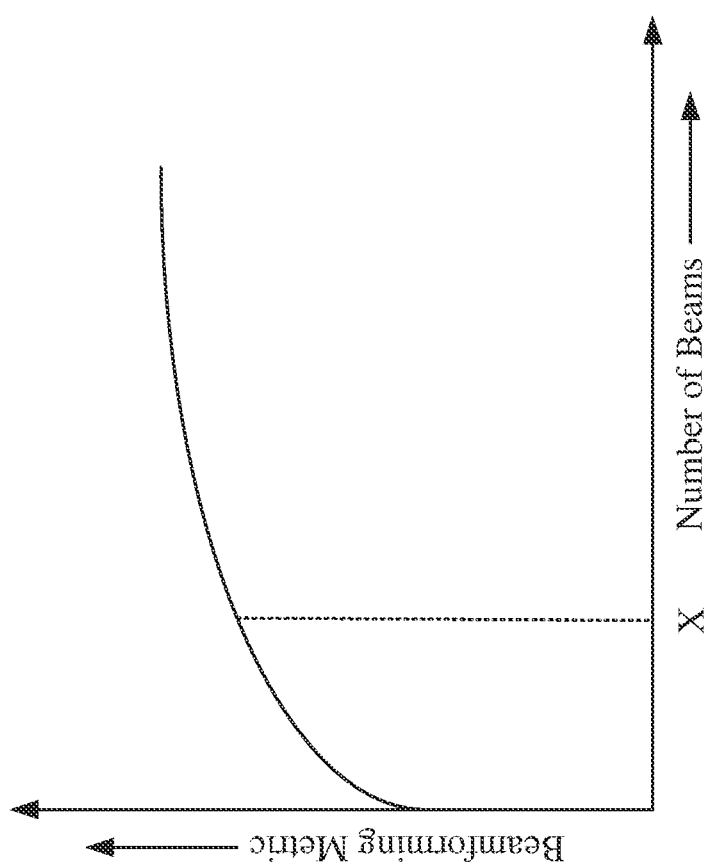
FIG. 11 is a graph illustrating an example of the expected performance enhancement based on the number of additional out-of-coverage beams according to some aspects.

FIG. 11 is a graph illustrating an example of the expected performance enhancement based on the number of additional out-of-coverage beams according to some aspects. In the example shown in FIG. 11, the performance of an enhanced codebook, as indicated by a suitable beamforming metric, increases as the number of additional beams increases. However, the number of beams may be limited by the number of antenna subarrays in the antenna module. Moreover, as the number of beams increases, the latency resulting from beam switching may also increase. Therefore, there is a tradeoff between the beamforming performance gain and the number of additional beams. In some examples, an optimum number of additional beams X may be selected to maximize the beamforming performance gain with minimal added latency. The optimum number of additional beams may be selected by the UE or by the network entity. For example, the network entity may select the number of additional beams based on UE capability and/or reliability of out-of-coverage measurements performed by the UE.

Figure 12:
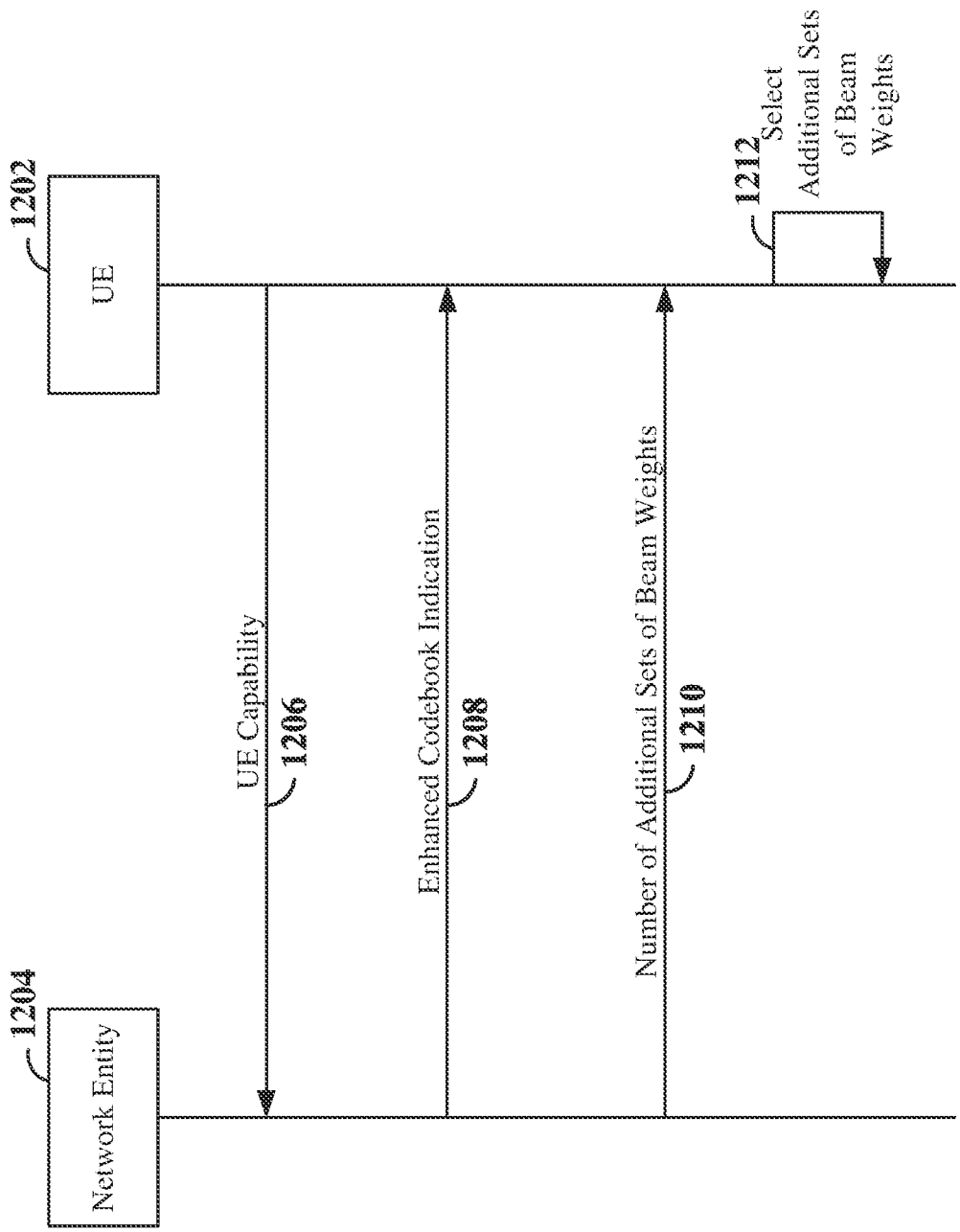
FIG. 12 is a signaling diagram illustrating exemplary signaling between a UE and a network entity for enhanced beamforming codebook design according to some aspects.

FIG. 12 is a signaling diagram illustrating exemplary signaling between a UE 1202 and a network entity 1204 for enhanced beamforming codebook design according to some aspects. The UE 1202 may correspond to any of the UEs or other wireless communication devices shown in any of FIGS. 1, 3, 4, 6, and/or 7. The network entity 1204 may correspond to any of the base stations or other network entities shown in FIGS. 1, 3, 4, 6, and/or 7. For example, the network entity 1204 may correspond to an aggregated base station, an RU, a DU, a CU, an IAB node, or other network device.

At 1206, the UE 1202 may transmit a capability of the UE to the network entity 1204. In some examples, the capability may indicate that the UE is capable of designing and using an enhanced beamforming codebook. In some examples, the capability may further indicate a reliability of out-of-coverage measurements performed by the UE. For example, reliability may be a mean squared error (MSE) in E field measurements performed by the UE 1202 over the out-of-coverage region. As another example, the reliability may be a standard deviation in terms of antenna array gains over the out-of-coverage region.

At 1208, the network entity 1204 may optionally provide an indication to the UE to configure the enhanced beamforming codebook (e.g., the network entity may authorize or allow the UE to configure the enhanced beamforming codebook). The indication to configure the enhanced beamforming codebook (e.g., the authorization) may be provided, for example, within DCI and/or a medium access control-control element (MAC-CE). In some examples, the network entity 1204 may allow the UE to configure the enhanced beamforming codebook based on the reliability and accuracy of out-of-coverage E field measurements. For example, E fields in the out-of-coverage region may be a result of multiple reflections inside the UE housing, which may induce parasitics or other distortions into the E field phase and amplitude measurements. As a result, the measured phase and/or amplitude may not be accurate or may be less reliable. The reliability of out-of-coverage measurements provided by the UE 1202 in the UE capability may be used by the network entity 1204 to determine whether the reliability is sufficient to allow the UE 1202 to generate the enhanced beamforming codebook. For example, the network entity 1204 may compare the reliability to a threshold and transmit the indication to the UE to configure the enhanced beamforming codebook in response to the reliability comparing favorably to the threshold (e.g., the MSE or standard deviation being less than the threshold). Otherwise, the network entity 1204 may not provide the indication to the UE to configure the enhanced beamforming codebook or the network entity 1204 may provide an indication that the UE 1202 is not allowed to (e.g., the UE is prevented from or denied the ability to) configure the enhanced beamforming codebook.

At 1210, the network entity 1204 may optionally provide an indication of a number of one or more additional sets of beam weights that may be added to the enhanced beamforming codebook based on the UE capability (e.g., based on the capability of the UE to design the enhanced beamforming codebook and/or the reliability of out-of-coverage measurements). The number of additional sets of beam weights may be provided, for example, within DCI and/or a MAC-CE. In some examples, the network entity 1204 may want to limit the number of additional sets of beam weights (e.g., the number of additional beams) to reduce control overhead and/or as a trade-off with expected performance gains, as shown in FIG. 11. At 1212, the UE 1202 may select the one or more additional sets of beam weights for the enhanced beamforming codebook (e.g., based on the out-of-coverage E field measurements and/or from pre-configured sets of beam weights).

Figure 13:
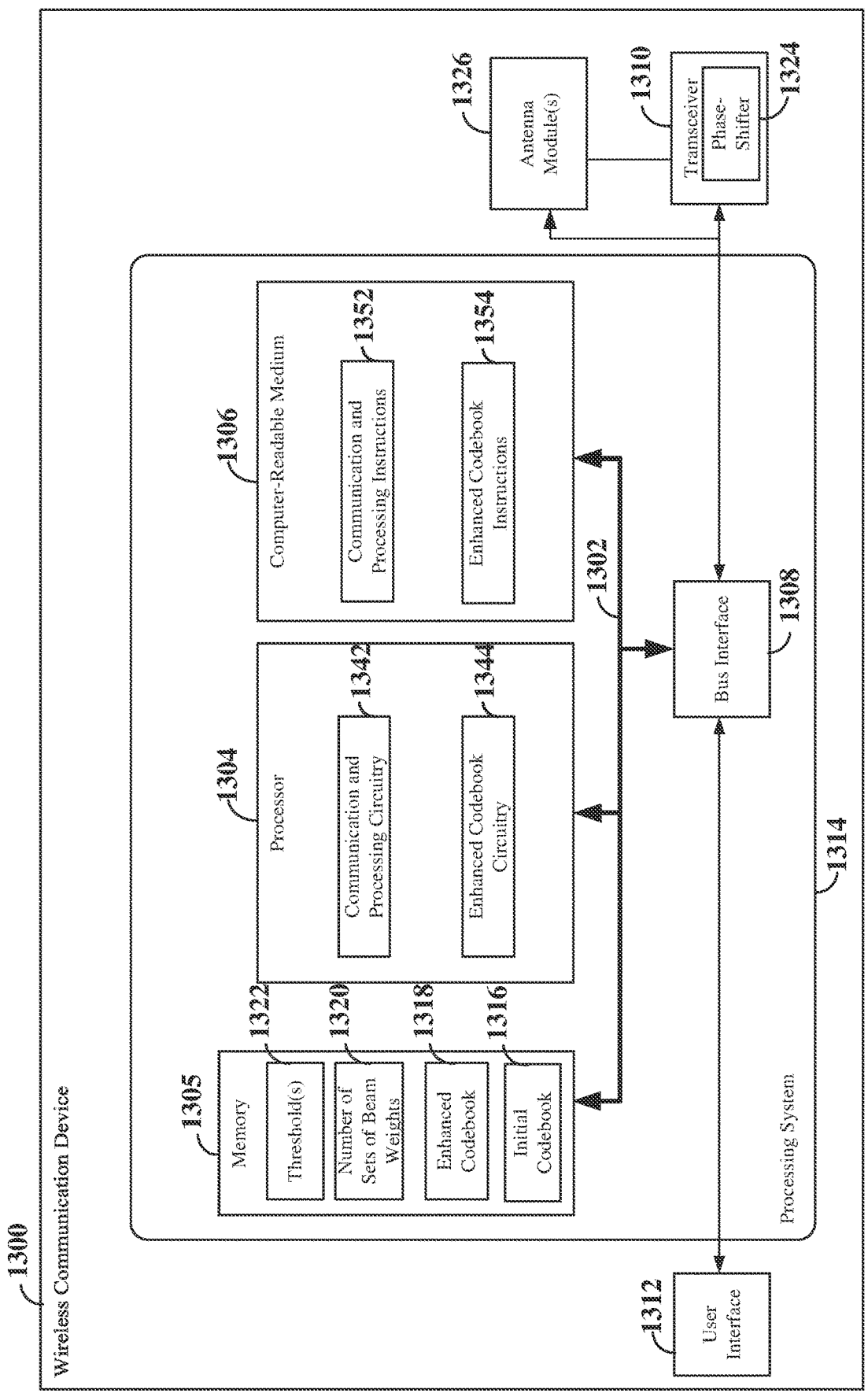
FIG. 13 is a block diagram illustrating an example of a hardware implementation for a wireless communication device employing a processing system according to some aspects.

FIG. 13 is a block diagram illustrating an example of a hardware implementation of a wireless communication device 1300 employing a processing system 1314 according to some aspects. For example, the wireless communication device 1300 may correspond to any of the UEs shown and described above in reference to FIGS. 1, 3, 4, 6, 7, and/or 12.

In accordance with various aspects of the disclosure, an element, or any portion of an element, or any combination of elements may be implemented with a processing system 1314 that includes one or more processors, such as processor 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1300 may be configured to perform any one or more of the functions described herein. That is, the processor 1304, as utilized in the wireless communication device 1300, may be used to implement any one or more of the methods or processes described and illustrated, for example, in FIGS. 12 and/or 14.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits, including one or more processors (represented generally by the processor 1304), one or more memories (represented generally by the memory 1305), and one or more computer-readable media (represented generally by the computer-readable medium 1306). In some examples, the computer-readable media 1306 may be included within or part of one or more of the memories 1305. The bus 1302 may also link various other circuits such as timing sources, peripherals, voltage regulators, and power management circuits, which are well known in the art, and therefore, are not described any further.

A bus interface 1308 provides an interface between the bus 1302, one or more transceivers 1310, and one or more antenna modules (e.g., one or more antenna arrays or panels) 1326. The transceiver 1310 and antenna module(s) 1326 provides a means for communicating with various other apparatus over a transmission medium (e.g., air interface). The bus interface 1308 further provides an interface between the bus 1302 and a user interface 1312 (e.g., keypad, display, touch screen, speaker, microphone, control features, etc.). Of course, such a user interface 1312 may be omitted in some examples.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. In some examples, the computer-readable medium 1306 may be part of the memory 1305. Those skilled in the art will recognize how best to implement the described functionality presented throughout this disclosure depending on the particular application and the overall design constraints imposed on the overall system. In some examples, the computer-readable medium 1306 may be implemented on an article of manufacture, which may further include one or more other elements or circuits, such as the processor 1304 and/or memory 1305.

The computer-readable medium 1306 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1304, may be responsible for managing the bus 1302 and general processing, including the execution of the software (e.g., instructions or computer-executable code) stored on the computer-readable medium 1306. The software, when executed by the processor 1304, causes the processing system 1314 to perform the various processes and functions described herein for any particular apparatus. The computer-readable medium 1306 and/or the memory 1305 may also be used for storing data that may be manipulated by the processor 1304 when executing software. For example, the memory 1305 may store one or more initial (in-coverage) beamforming codebooks 1316 (e.g., one for each of the antenna modules of the wireless communication device 1300), one or more enhanced (in-coverage and out-of-coverage) beamforming codebooks 1318, a number of sets of beam weights 1320 (e.g., additional sets of beam weights), and one or more threshold(s) 1322.

In some aspects of the disclosure, the processor 1304 may include circuitry configured for various functions. For example, the processor 1304 may include communication and processing circuitry 1342 configured to communicate with one or more UEs and/or one or more network entities. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains.

In some implementations where the communication involves receiving information, the communication and processing circuitry 1342 may obtain information from a component of the wireless communication device 1300 (e.g., from the transceiver 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for demodulating, a means for decoding, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the transceiver 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

In some examples, the communication and processing circuitry 1342 may be configured to receive and process downlink beamformed signals at a mmWave frequency or a sub-6 GHz frequency via the transceiver 1310 and the antenna module(s) 1326 (e.g., using a phase-shifter 1324). In addition, the communication and processing circuitry 1342 may be configured to generate and transmit uplink beamformed signals at a mmWave frequency or a sub-6 GHz frequency via the transceiver 1310 and antenna module(s) 1326 (e.g., using the phase-shifter 1324).

In some examples, the communication and processing circuitry 1342 may be configured to receive, from a network entity, an indication of a number of one or more additional sets of beam weights 1320 to be added to an initial beamforming codebook 1316 to produce an enhanced beamforming codebook 1318. In some examples, the communication and processing circuitry 1342 may be configured to receive DCI or a MAC-CE including the indication of the number of one or more additional sets of beam weights 1320 and may further store the number of additional sets of beam weights 1320 within, for example, memory 1305.

The communication and processing circuitry 1342 may further be configured to transmit a capability of the wireless communication device to use an enhanced beamforming codebook 1318 to the network entity. In some examples, the capability may indicate a reliability of out-of-coverage measurements performed by the wireless communication device. For example, the reliability may include a mean squared error of the out-of-coverage measurements or a standard deviation of the out-of-coverage measurements. The communication and processing circuitry 1342 may further receive, from the network entity, at least one of an indication to configure the enhanced beamforming codebook 1318 or the number of additional sets of beam weights 1320 based on the indicated reliability. The communication and processing circuitry 1342 may further be configured to execute communication and processing software 1352 stored on the computer-readable medium 1306 to implement one or more functions described herein.

The processor 1304 may further include enhanced codebook circuitry 1344, configured to provide an initial beamforming codebook 1316 configuring a plurality of beam weights intended to cover an in-coverage region corresponding to the boresight direction and a neighborhood thereof of an antenna module 1326 of the wireless communication device 1300. The enhanced codebook circuitry 1344 may further be configured to configure one or more additional sets of beam weights intended to cover an out-of-coverage region beyond the boresight direction and the neighborhood thereof of the antenna module 1326 and to add the one or more additional sets of beam weights to the initial beamforming codebook 1316 to produce the enhanced beamforming codebook 1318.

In some examples, the out-of-coverage region includes a portion of a sphere around the antenna module 1326 beyond the boresight direction and the neighborhood thereof or for which a gap between an optimal performance with maximal ratio combining and an actual performance with the initial beamforming codebook exceeds a threshold 1322. In some examples, the one or more additional sets of beam weights include beam weights intended to cover at least one of a side lobe or a back lobe of the antenna module 1326.

In some examples, the plurality of beam weights include initial sets of beam weights, each of the initial sets of beam weights corresponding to a combination of amplitude and phase shift values for each antenna element in the antenna module 1326. In addition, the initial beamforming codebook 1316 may include a respective entry for each of the initial sets of beam weights and the enhanced beamforming codebook 1318 may further include a respective additional entry for each of the one or more additional sets of beam weights 1320.

In some examples, the enhanced codebook circuitry 1344 may be configured to measure a response of the antenna module 1326 over the out-of-coverage region to identify the one or more additional sets of beam weights 1320 that maximize projection of energy in the out-of-coverage region. In some examples, the enhanced codebook circuitry 1344 may be configured to select the one or more additional sets of beam weights 1320 from a set of pre-configured beam weights in the out-of-coverage region. The enhanced codebook circuitry 1344 may further be configured to generate (e.g., configure or design) a number of the one or more additional sets of beam weights 1320 in accordance with the number of additional sets of beam weights provided by the network entity. The enhanced codebook circuitry 1344 may further be configured to execute enhanced codebook instructions (software) 1354 stored on the computer-readable medium 1306 to implement one or more functions described herein.

Figure 14:
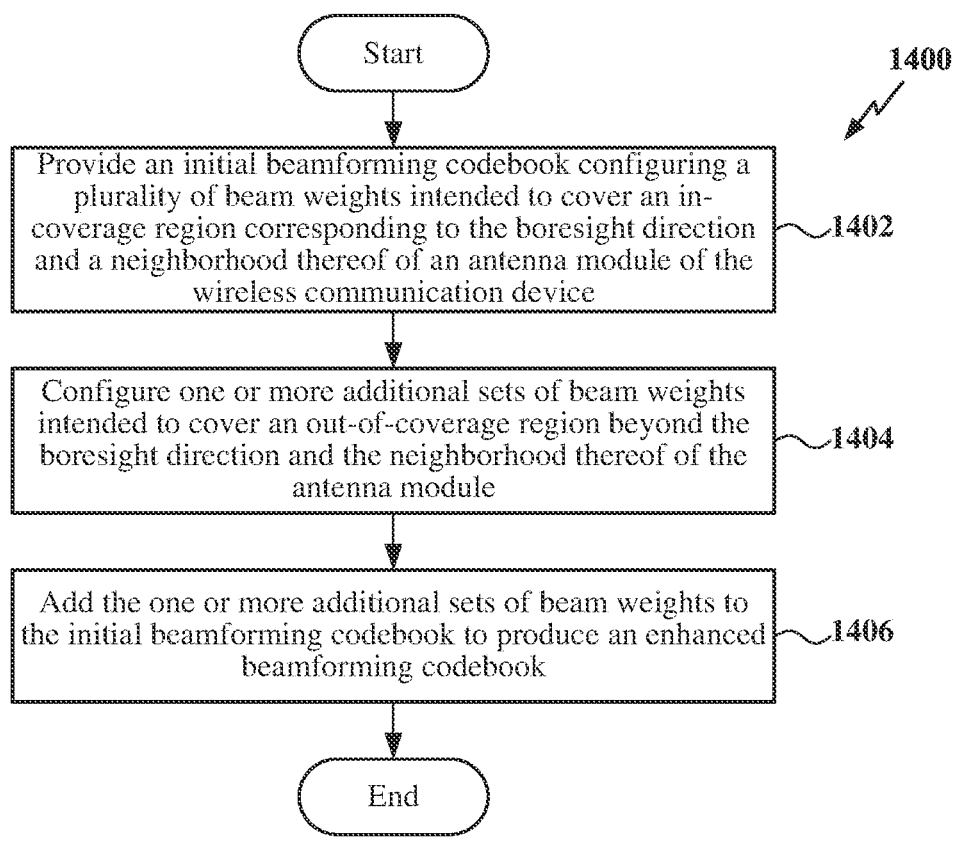
FIG. 14 is a flow chart illustrating an exemplary process for enhanced beamforming codebook design according to some aspects.

FIG. 14 is a flow chart illustrating another exemplary process 1400 for enhanced beamforming codebook design according to some aspects. As described below, some or all illustrated features may be omitted in a particular implementation within the scope of the present disclosure, and some illustrated features may not be required for implementation of all embodiments. In some examples, the process 1400 may be carried out by the wireless communication device 1300 illustrated in FIG. 13. In some examples, the process 1400 may be carried out by any suitable apparatus or means for carrying out the functions or algorithm described below.

At block 1402, the wireless communication device may provide an initial beamforming codebook configuring a plurality of beam weights intended to cover an in-coverage region corresponding to the boresight direction and a neighborhood thereof of an antenna module of the wireless communication device. For example, the enhanced codebook circuitry 1344 shown and described above in connection with FIG. 13 may provide a means to provide the initial beamforming codebook.

At block 1404, the wireless communication device may configure one or more additional sets of beam weights intended to cover an out-of-coverage region beyond the boresight direction and the neighborhood thereof of the antenna module. In some examples, the out-of-coverage region includes a portion of a sphere around the antenna module beyond the boresight direction and the neighborhood thereof or for which a gap between an optimal performance with maximal ratio combining and an actual performance with the initial beamforming codebook exceeds a threshold. In some examples, the one or more additional sets of beam weights include beam weights intended to cover at least one of a side lobe or a back lobe of the antenna module.

In some examples, the wireless communication device may measure a response of the antenna module over the out-of-coverage region to identify the one or more additional sets of beam weights that maximize projection of energy in the out-of-coverage region. In some examples, the wireless communication device may select the one or more additional sets of beam weights from a set of pre-configured beam weights in the out-of-coverage region.

In some examples, the wireless communication device may receive an indication of a number of the one or more additional sets of beam weights from a network entity. For example, the wireless communication device may receive downlink control information (DCI) or a medium access control-control element (MAC-CE) including the indication of the number of the one or more additional sets of beam weights. In some examples, the wireless communication device may transmit a capability of the wireless communication device to use the enhanced beamforming codebook to a network entity. In some examples, the capability indicates a reliability of out-of-coverage measurements performed by the wireless communication device. In some examples, the wireless communication device may further receive, from the network entity, at least one of an indication to configure the enhanced beamforming codebook or a number of the one or more additional sets of beam weights based on the indicated reliability. In some examples, the indicated reliability includes a mean squared error of the out-of-coverage measurements or a standard deviation of the out-of-coverage measurements. For example, the enhanced codebook circuitry 1344 shown and described above in connection with FIG. 13 may provide a means to configure the one or more additional sets of beam weights.

At 1406, the wireless communication device may add the one or more additional sets of beam weights to the initial beamforming codebook to produce an enhanced beamforming codebook. In some examples, the plurality of beam weights includes initial sets of beam weights, each of the initial sets of beam weights corresponding to a combination of amplitude and phase shift values for each antenna element in the antenna module. In addition, the initial beamforming codebook includes a respective entry for each of the initial sets of beam weights, and the enhanced beamforming codebook further includes a respective additional entry for each of the one or more additional sets of beam weights. For example, the enhanced codebook circuitry 1344 shown and described above in connection with FIG. 13 may provide a means to add the one or more additional sets of beam weights to the initial beamforming codebook to produce an enhanced beamforming codebook.

In one configuration, the wireless communication device includes means for providing an initial beamforming codebook configuring a plurality of beam weights intended to cover an in-coverage region corresponding to the boresight direction and a neighborhood thereof of an antenna module of the wireless communication device, means for configuring one or more additional sets of beam weights intended to cover an out-of-coverage region beyond the boresight direction and the neighborhood thereof of the antenna module, and means for adding the one or more additional sets of beam weights to the initial beamforming codebook to produce an enhanced beamforming codebook. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3-6, 12, 13, and/or 15, and utilizing, for example, the processes and/or algorithms described herein in relation to FIGS. 12 and/or 14.

Figure 15:
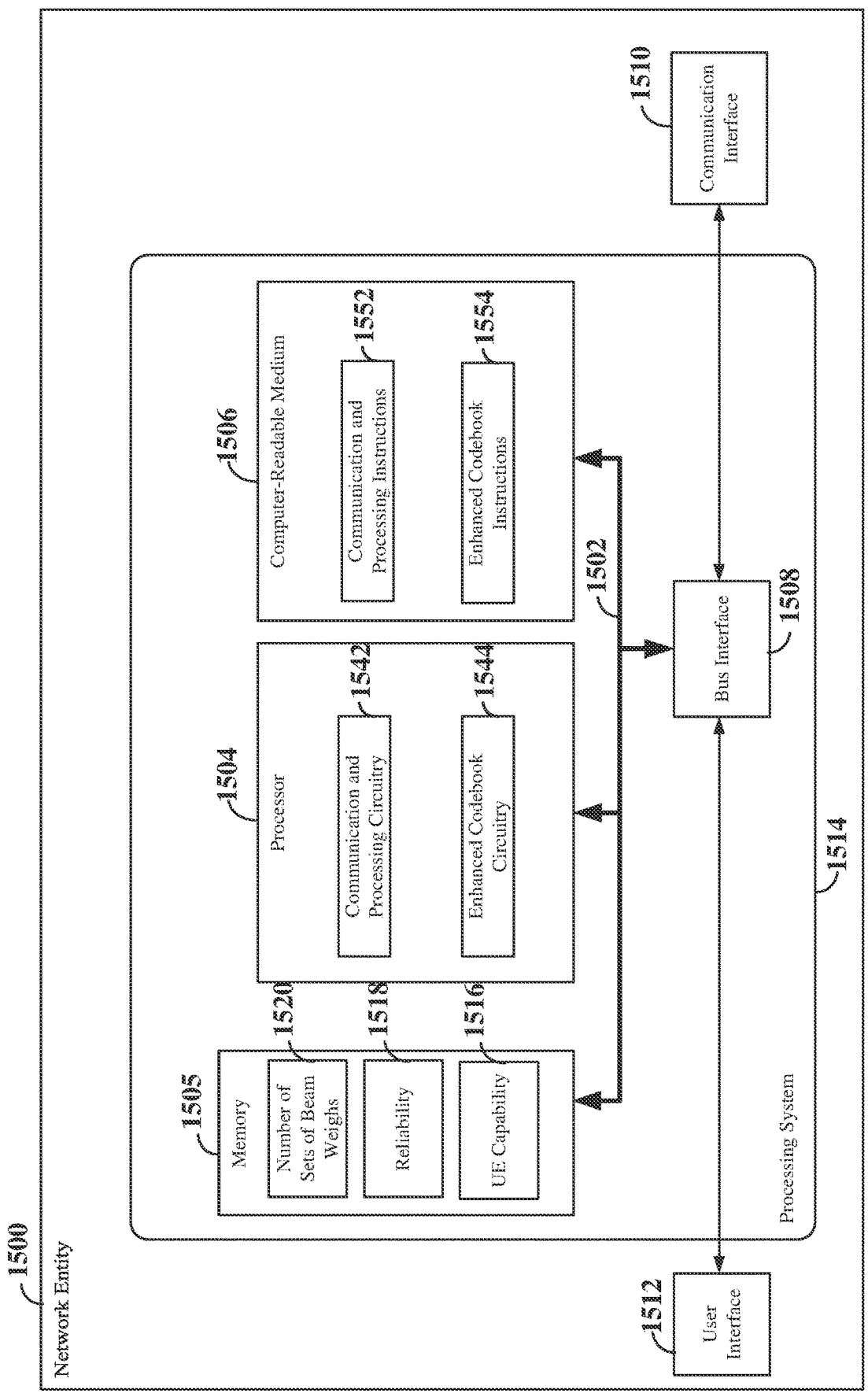
FIG. 15 is a block diagram illustrating an example of a hardware implementation for a network entity employing a processing system according to some aspects.

FIG. 15 is a block diagram illustrating an example of a hardware implementation of a network entity 1500 employing a processing system 1514 according to some aspects. The network entity 1500 may be, for example, a network entity or other network node illustrated in any one or more of FIGS. 1, 3, 4 and/or 12. For example, the network entity may be a base station (e.g., gNB, eNB) or other scheduling entity as illustrated in any one or more of FIGS. 1 and/or 3. A network entity may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In addition, a network entity may be a stationary network entity or a mobile network entity.

In accordance with various aspects of the disclosure, an element, or any portion of an element, or any combination of elements may be implemented with a processing system 1514 that includes one or more processors, such as processor 1504. The processing system 1514 may be substantially the same as the processing system 1314 as shown and described above in connection with FIG. 13, including a bus interface 1508, a bus 1502, a memory 1505 (e.g., one or more memories), a processor 1504 (e.g., one or more processors), and a computer-readable medium 1506 (e.g., one or more computer-readable mediums). Accordingly, their descriptions will not be repeated for the sake of brevity. Furthermore, the network entity 1500 may include an optional user interface 1512 and a communication interface 1515 (e.g., wired or wireless), such as one or more transceivers or one or more network interfaces.

The processor 1504, as utilized in the network entity 1500, may be used to implement any one or more of the processes described below. In some examples, the memory 1505 may store a UE capability 1516, a reliability of out-of-coverage measurements 1518, and a number of sets of beam weights 1520 (e.g., a number of additional sets of beam weights).

In some aspects of the disclosure, the processor 1504 may include communication and processing circuitry 1542 configured for various functions, including, for example, communicating with one or more wireless communication devices (e.g., UEs), a core network node, or other network entity. In some examples (e.g., in an aggregated base station architecture), the communication and processing circuitry 1542 may include one or more hardware components that provide the physical structure that performs processes related to wireless communication (e.g., signal reception and/or signal transmission) and/or signal processing (e.g., processing a received signal and/or processing a signal for transmission). In addition, the communication and processing circuitry 1542 may be configured to process and transmit downlink traffic and downlink control and receive and process uplink traffic and uplink control.

In some examples, the communication and processing circuitry 1542 may be configured to receive a capability 1516 of a UE to use an enhanced beamforming codebook to cover an out-of-coverage region beyond a boresight direction and a neighborhood thereof of an antenna module of the UE. In some examples, the capability 1516 indicates a reliability 1518 of out-of-coverage measurements performed by the UE.

The communication and processing circuitry 1542 may further be configured to provide an indication of a number of one or more sets of beam weights 1520 to add to an initial beamforming codebook of the UE to produce the enhanced beamforming codebook based on the capability 1516. In some examples, the communication and processing circuitry 1542 may be configured to provide downlink control information (DCI) or a medium access control-control element (MAC-CE) including the indication of the number of the one or more sets of beam weights 1520. In some examples, the communication and processing circuitry 1542 may be configured to provide at least one of an indication to configure the enhanced beamforming codebook or the number of the one or more sets of beam weights 1520 based on the indicated reliability 1518. The communication and processing circuitry 1542 may further be configured to execute communication and processing software 1552 stored on the computer-readable medium 1506 to implement one or more functions described herein.

The processor 1504 may further include enhanced codebook circuitry 1544, configured to determine whether to provide the indication to configure the enhanced beamforming codebook (e.g., whether to allow or authorize the UE to configure the enhanced beamforming codebook) based on the capability 1516 and/or the reliability 1518. The enhanced codebook circuitry 1544 may further be configured to determine or identify the number of the one or more sets of beam weights 1520 based on the capability 1516 and/or the reliability 1518. The enhanced codebook circuitry 1544 may further be configured to execute enhanced codebook software 1554 stored on the computer-readable medium 1506 to implement one or more functions described herein.

Figure 16:
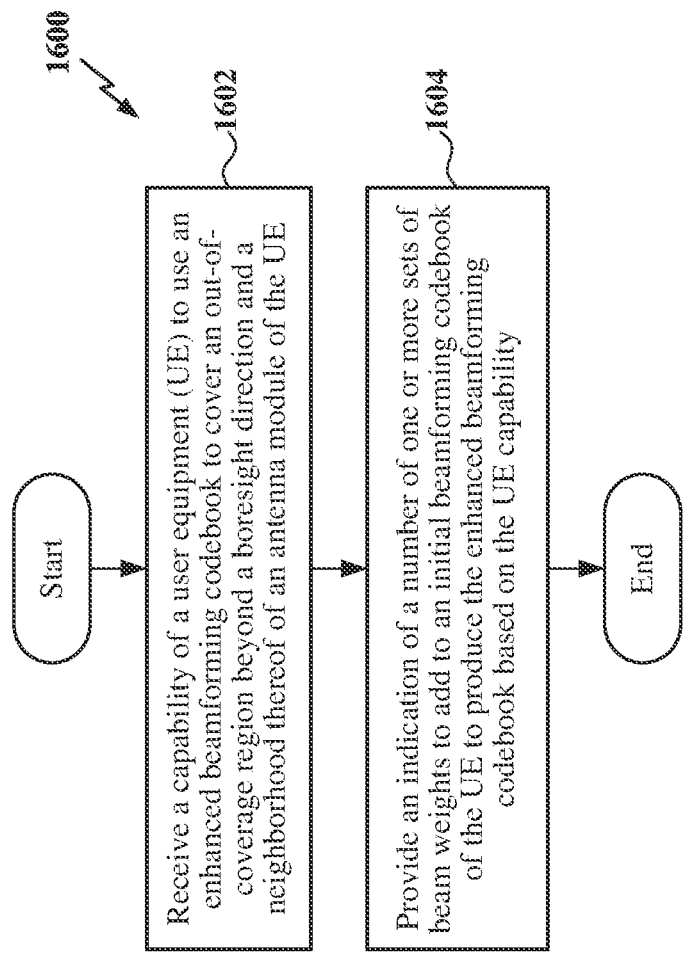
FIG. 16 is a flow chart illustrating another exemplary process for enhanced beamforming codebook design according to some aspects.

FIG. 16 is a flow chart illustrating an exemplary process 1600 for enhanced beamforming codebook design according to some aspects. As described below, some or all illustrated features may be omitted in a particular implementation within the scope of the present disclosure, and some illustrated features may not be required for implementation of all embodiments. In some examples, the process 1600 may be carried out by the network entity 1500 illustrated in FIG. 15. In some examples, the process 1600 may be carried out by any suitable apparatus or means for carrying out the functions or algorithm described below.

At block 1602, the network entity may receive a capability of a user equipment (UE) to use an enhanced beamforming codebook to cover an out-of-coverage region beyond a boresight direction and a neighborhood thereof of an antenna module of the UE. In some examples, the capability indicates a reliability of out-of-coverage measurements performed by the UE. For example, the communication and processing circuitry 1542, together with the communication interface 1530, shown and described above in connection with FIG. 15 may provide a means to receive the capability of the UE.

At block 1604, the network entity may provide an indication of a number of one or more sets of beam weights to add to an initial beamforming codebook of the UE to produce the enhanced beamforming codebook based on the capability. In some examples, the network entity may provide downlink control information (DCI) or a medium access control-control element (MAC-CE) including the indication of the number of the one or more sets of beam weights. In some examples, the network entity may provide at least one of an indication to configure the enhanced beamforming codebook or the number of the one or more sets of beam weights based on the indicated reliability. For example, the communication and processing circuitry 1542, together with the communication interface 1530, shown and described above in connection with FIG. 15 may provide a means to provide the number of one or more sets of beam weights.

The following provides an overview of aspects of the present disclosure:

Aspect 1: A method operable at a wireless communication device, the method comprising: providing an initial beamforming codebook configuring a plurality of beam weights intended to cover an in-coverage region corresponding to a boresight direction and a neighborhood thereof of an antenna module of the wireless communication device; configuring one or more additional sets of beam weights intended to cover an out-of-coverage region beyond the boresight direction and the neighborhood thereof of the antenna module; and adding the one or more additional sets of beam weights to the initial beamforming codebook to produce an enhanced beamforming codebook.

Aspect 2: The method of aspect 1, wherein the out-of-coverage region comprises a portion of a sphere around the antenna module beyond the boresight direction and the neighborhood thereof or for which a gap between an optimal performance with maximal ratio combining and an actual performance with the initial beamforming codebook exceeds a threshold.

Aspect 3: The method of aspect 1 or 2, wherein the one or more additional sets of beam weights comprise beam weights intended to cover at least one of a side lobe or a back lobe of the antenna module.

Aspect 4: The method of any of aspects 1 through 3, wherein the plurality of beam weights comprise initial sets of beam weights, each of the initial sets of beam weights corresponding to a combination of amplitude and phase shift values for each antenna element in the antenna module, the initial beamforming codebook comprises a respective entry for each of the initial sets of beam weights, and the enhanced beamforming codebook further comprises a respective additional entry for each of the one or more additional sets of beam weights.

Aspect 5: The method of aspect 4, wherein the configuring the one or more additional sets of beam weights further comprises: measuring a response of the antenna module over the out-of-coverage region to identify the one or more additional sets of beam weights that maximize projection of energy in the out-of-coverage region.

Aspect 6: The method of any of aspects 1 through 3, wherein the configuring the one or more additional sets of beam weights further comprises: selecting the one or more additional sets of beam weights from a set of pre-configured beam weights in the out-of-coverage region.

Aspect 7: The method of any of aspects 1 through 6, further comprising: receiving an indication of a number of the one or more additional sets of beam weights from a network entity.

Aspect 8: The method of aspect 7, wherein the receiving the indication of the number of the one or more additional sets of beam weights further comprises: receiving downlink control information (DCI) or a medium access control-control element (MAC-CE) comprising the indication of the number of the one or more additional sets of beam weights.

Aspect 9: The method of any of aspects 1 through 8, further comprising: transmitting a capability of the wireless communication device to use the enhanced beamforming codebook to a network entity.

Aspect 10: The method of aspect 9, wherein the capability indicates a reliability of out-of-coverage measurements performed by the wireless communication device.

Aspect 11: The method of aspect 10, further comprising: receiving, from the network entity, at least one of an indication to configure the enhanced beamforming codebook or a number of the one or more additional sets of beam weights based on the indicated reliability.

Aspect 12: The method of aspect 10 or 11, wherein the indicated reliability comprises a mean squared error of the out-of-coverage measurements or a standard deviation of the out-of-coverage measurements.

Aspect 13: An apparatus for wireless communication at a UE comprising one or more memories and one or more processors coupled to the one or more memories, the one or more processors being configured to perform a method of any one of aspects 1 through 12.

Aspect 14: An apparatus for wireless communication at a UE comprising at least one means for performing a method of any one of aspects 1 through 12.

Aspect 15: A non-transitory computer-readable medium having stored therein instructions executable by one or more processors of a UE to perform a method of any one of aspects 1 through 12.

Aspect 16: A method operable at a wireless communication device, the method comprising: receiving a capability of a user equipment (UE) to use an enhanced beamforming codebook to cover an out-of-coverage region beyond a boresight direction and a neighborhood thereof of an antenna module of the UE; and providing an indication of a number of one or more sets of beam weights to add to an initial beamforming codebook of the UE to produce the enhanced beamforming codebook based on the capability.

Aspect 17: The method of aspect 16, wherein the providing the indication of the number of the one or more sets of beam weights further comprises: providing downlink control information (DCI) or a medium access control-control element (MAC-CE) comprising the indication of the number of the one or more sets of beam weights.

Aspect 18: The method of aspect 16 or 17, wherein the capability indicates a reliability of out-of-coverage measurements performed by the UE.

Aspect 19: The method of aspect 18, further comprising: providing at least one of an indication to configure the enhanced beamforming codebook or the number of the one or more sets of beam weights based on the indicated reliability.

Aspect 20: An apparatus for wireless communication at a network entity comprising one or more memories and one or more processors coupled to the one or more memories, the one or more processors being configured to perform a method of any one of aspects 16 through 19.

Aspect 21: An apparatus for wireless communication at a network entity comprising at least one means for performing a method of any one of aspects 16 through 19.

Aspect 22: A non-transitory computer-readable medium having stored therein instructions executable by one or more processors of a network entity to perform a method of any one of aspects 16 through 19.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-6, 12, 13, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a wireless communication device, the apparatus comprising:
   one or more antenna modules;
   one or more memories configured to store an initial beamforming codebook configuring a plurality of beam weights intended to cover an in-coverage region corresponding to a boresight direction and a neighborhood thereof of an antenna module of the wireless communication device; and
   one or more processors coupled to the one or more memories and the one or more antenna modules, the one or more processors being configured to:
      configure one or more additional sets of beam weights intended to cover an out-of-coverage region beyond the boresight direction and the neighborhood thereof of the antenna module; and
      add the one or more additional sets of beam weights to the initial beamforming codebook to produce an enhanced beamforming codebook.

2. The apparatus of claim 1, wherein the out-of-coverage region comprises a portion of a sphere around the antenna module beyond the boresight direction and the neighborhood thereof or for which a gap between an optimal performance with maximal ratio combining and an actual performance with the initial beamforming codebook exceeds a threshold.

3. The apparatus of claim 1, wherein the one or more additional sets of beam weights comprise beam weights intended to cover at least one of a side lobe or a back lobe of the antenna module.

4. The apparatus of claim 1, wherein:
   the plurality of beam weights comprise initial sets of beam weights, each of the initial sets of beam weights corresponding to a combination of amplitude and phase shift values for each antenna element in the antenna module,
   the initial beamforming codebook comprises a respective entry for each of the initial sets of beam weights, and
   the enhanced beamforming codebook further comprises a respective additional entry for each of the one or more additional sets of beam weights.

5. The apparatus of claim 4, wherein the configuring the one or more additional sets of beam weights further comprises:
   measuring a response of the antenna module over the out-of-coverage region to identify the one or more additional sets of beam weights that maximize projection of energy in the out-of-coverage region.

6. The apparatus of claim 1, wherein the one or more processors are further configured to:
   select the one or more additional sets of beam weights from a set of pre-configured beam weights in the out-of-coverage region.

7. The apparatus of claim 1, wherein the one or more processors are further configured to:
   receive an indication of a number of the one or more additional sets of beam weights from a network entity.

8. The apparatus of claim 7, wherein the one or more processors are further configured to:
   receive downlink control information (DCI) or a medium access control-control element (MAC-CE) comprising the indication of the number of the one or more additional sets of beam weights.

9. The apparatus of claim 1, wherein the one or more processors are further configured to:
   transmit a capability of the wireless communication device to use the enhanced beamforming codebook to a network entity.

10. The apparatus of claim 9, wherein the capability indicates a reliability of out-of-coverage measurements performed by the wireless communication device.

11. The apparatus of claim 10, wherein the one or more processors are further configured to:

receive, from the network entity, at least one of an indication to configure the enhanced beamforming codebook or a number of the one or more additional sets of beam weights based on the indicated reliability.

12. The apparatus of claim 10, wherein the indicated reliability comprises a mean squared error of the out-of-coverage measurements or a standard deviation of the out-of-coverage measurements.

13. A method operable at a wireless communication device, the method comprising:
providing an initial beamforming codebook configuring a plurality of beam weights intended to cover an in-coverage region corresponding to a boresight direction and a neighborhood thereof of an antenna module of the wireless communication device;
configuring one or more additional sets of beam weights intended to cover an out-of-coverage region beyond the boresight direction and the neighborhood thereof of the antenna module; and
adding the one or more additional sets of beam weights to the initial beamforming codebook to produce an enhanced beamforming codebook.

14. The method of claim 13, wherein the out-of-coverage region comprises a portion of a sphere around the antenna module beyond the boresight direction and the neighborhood thereof or for which a gap between an optimal performance with maximal ratio combining and an actual performance with the initial beamforming codebook exceeds a threshold.

15. The method of claim 13, wherein the one or more additional sets of beam weights comprise beam weights intended to cover at least one of a side lobe or a back lobe of the antenna module.

16. The method of claim 13, wherein:
the plurality of beam weights comprise initial sets of beam weights, each of the initial sets of beam weights corresponding to a combination of amplitude and phase shift values for each antenna element in the antenna module,
the initial beamforming codebook comprises a respective entry for each of the initial sets of beam weights, and
the enhanced beamforming codebook further comprises a respective additional entry for each of the one or more additional sets of beam weights.

17. The method of claim 16, wherein the configuring the one or more additional sets of beam weights further comprises:
measuring a response of the antenna module over the out-of-coverage region to identify the one or more additional sets of beam weights that maximize projection of energy in the out-of-coverage region.

18. The method of claim 13, wherein the configuring the one or more additional sets of beam weights further comprises:
selecting the one or more additional sets of beam weights from a set of pre-configured beam weights in the out-of-coverage region.

19. The method of claim 13, further comprising:
receiving an indication of a number of the one or more additional sets of beam weights from a network entity.

20. The method of claim 19, wherein the receiving the indication of the number of the one or more additional sets of beam weights further comprises:
receiving downlink control information (DCI) or a medium access control-control element (MAC-CE) comprising the indication of the number of the one or more additional sets of beam weights.

21. The method of claim 13, further comprising:
transmitting a capability of the wireless communication device to use the enhanced beamforming codebook to a network entity.

22. The method of claim 21, wherein the capability indicates a reliability of out-of-coverage measurements performed by the wireless communication device.

23. The method of claim 22, further comprising:
receiving, from the network entity, at least one of an indication to configure the enhanced beamforming codebook or a number of the one or more additional sets of beam weights based on the indicated reliability.

24. The method of claim 22, wherein the indicated reliability comprises a mean squared error of the out-of-coverage measurements or a standard deviation of the out-of-coverage measurements.

25. An apparatus for wireless communication at a network entity, the apparatus comprising:
one or more memories; and
one or more processors coupled to the one or more memories, the one or more processors being configured to:
receive a capability of a user equipment (UE) to use an enhanced beamforming codebook to cover an out-of-coverage region beyond a boresight direction and a neighborhood thereof of an antenna module of the UE; and
provide an indication of a number of one or more sets of beam weights to add to an initial beamforming codebook of the UE to produce the enhanced beamforming codebook based on the capability.

26. The apparatus of claim 25, wherein the one or more processors is further configured to:
provide downlink control information (DCI) or a medium access control-control element (MAC-CE) comprising the indication of the number of the one or more sets of beam weights.

27. The apparatus of claim 25, wherein the capability indicates a reliability of out-of-coverage measurements performed by the UE.

28. The apparatus of claim 27, wherein the one or processors is further configured to:
provide at least one of an indication to configure the enhanced beamforming codebook or the number of the one or more sets of beam weights based on the indicated reliability.

29. A method operable at a wireless communication device, the method comprising:
receiving a capability of a user equipment (UE) to use an enhanced beamforming codebook to cover an out-of-coverage region beyond a boresight direction and a neighborhood thereof of an antenna module of the UE; and
providing an indication of a number of one or more sets of beam weights to add to an initial beamforming codebook of the UE to produce the enhanced beamforming codebook based on the capability.

30. The method of claim 29, wherein the capability indicates a reliability of out-of-coverage measurements performed by the UE, and further comprising:
providing at least one of an indication to configure the enhanced beamforming codebook or the number of the one or more sets of beam weights based on the indicated reliability.

* * * * *